United States Patent
Yoon

(10) Patent No.: US 12,415,519 B2
(45) Date of Patent: Sep. 16, 2025

(54) CONTROL METHOD FOR DRIFT DRIVING A VEHICLE

(71) Applicants: HYUNDAI MOTOR COMPANY, Seoul (KR); KIA CORPORATION, Seoul (KR)

(72) Inventor: Ye Ahn Yoon, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 51 days.

(21) Appl. No.: 18/598,210

(22) Filed: Mar. 7, 2024

(65) Prior Publication Data
US 2025/0091581 A1 Mar. 20, 2025

(30) Foreign Application Priority Data
Sep. 15, 2023 (KR) .......... 10-2023-0122838

(51) Int. Cl.
*B60W 30/18* (2012.01)

(52) U.S. Cl.
CPC ... *B60W 30/18163* (2013.01); *B60W 2720/30* (2013.01)

(58) Field of Classification Search
CPC ......... B60W 2520/14; B60W 2720/14; B60W 2720/30; B60W 2720/403; B60W 30/02; B60W 30/045; B60W 30/18163; B60W 50/082

See application file for complete search history.

(56) References Cited

U.S. PATENT DOCUMENTS

| | | | |
|---|---|---|---|
| 9,687,741 B1 * | 6/2017 | Kim | A63F 13/2145 |
| 10,596,902 B2 * | 3/2020 | Lim | B60K 23/0808 |
| 11,708,107 B2 * | 7/2023 | Zhang | B60K 7/0007 |
| | | | 180/167 |
| 11,833,909 B2 * | 12/2023 | Pettersson | B60L 3/10 |
| 12,157,475 B2 * | 12/2024 | Ga | B60W 30/188 |
| 2019/0337385 A1 | 11/2019 | Lim | |
| 2024/0166216 A1 * | 5/2024 | Park | B60W 40/13 |
| 2024/0182108 A1 * | 6/2024 | Zhou | B60W 40/114 |
| 2025/0145019 A1 * | 5/2025 | Farahmand | B60W 50/082 |
| 2025/0153580 A1 * | 5/2025 | Oh | B60L 15/20 |
| 2025/0153702 A1 * | 5/2025 | Sekiguchi | B60W 20/10 |

FOREIGN PATENT DOCUMENTS

KR 20190127433 A 11/2019

* cited by examiner

*Primary Examiner* — Carl C Staubach
(74) *Attorney, Agent, or Firm* — Lempia Summerfield Katz LLC

(57) ABSTRACT

A control method for drift driving a vehicle supports a drift entry assistance function and a drift maintenance assistance function while maximizing driver's drift driving experience. The control method includes determining, by a controller, whether or not drift entry assistance control is required based on vehicle driving state information, when the vehicle enters a drift mode, and performing, by the controller, the drift entry assistance control using a torque vectoring motor so that the vehicle reaches a drift driving state when determining that the drift entry assistance control is required.

20 Claims, 6 Drawing Sheets

CONTROL METHOD FOR DRIFT DRIVING A VEHICLE

CROSS-REFERENCE TO RELATED APPLICATION

This application claims under 35 U.S.C. § 119(a) the benefit of priority to Korean Patent Application No. 10-2023-0122838 filed on Sep. 15, 2023, the entire contents of which are incorporated herein by reference.

BACKGROUND

(a) Technical Field

The present disclosure relates to a control method of drift driving a vehicle. More particularly, the present disclosure relates to a control method of drift driving a vehicle that may support a drift entry assistance function and a drift maintenance assistance function while maximizing the driver's drift driving experience.

(b) Background Art

Drifting is a driving technique where a driver oversteers a vehicle by slipping the driving wheels using driving force of the vehicle, and continuously drives the vehicle while causing the front wheels to be pointing in the opposite direction to the turning direction of the vehicle.

For example, in order to maintain a high exit speed at a corner, the driver may intentionally cause rear wheels to slip while maintaining control of the vehicle so as to cause an oversteer state of the vehicle, thereby allowing the vehicle to pass through the corner.

When the vehicle is in a countersteer state in which the slip angle of the rear wheels is greater than the slip angle of the front wheels and the steering angle direction of the front wheels is opposite to the turning direction of the vehicle, the vehicle may exit a corner while maintaining a high exit speed by maintaining a dynamic equilibrium state during turning. In this case, the driver may drive the vehicle in a desired turning direction by finely operating a steering wheel.

Whether or not to make drift driving more fun is an important marketing point for high performance vehicles, such as sedans, coupes, sports cars, and rear wheel drive (RWD)-based vehicles having the tendency of sports cars.

However, when a high-performance vehicle is equipped with an all-wheel drive (AWD) system, the slip angle of the rear wheels is reduced due to an increase in vehicle straightness caused by the driving force of the front wheels. Thus, it is difficult to perform drift driving of the vehicle.

Therefore, when purchasing vehicles, consumers decide or choose between front engine rear wheel drive (FR)-based two-wheel drive (2WD) vehicles, which allow drifting to be feasible but are disadvantageous in terms of vehicle stability during normal driving, and FR-based all-wheel-drive (AWD) vehicles, which are disadvantageous in terms of drifting but have excellent driving stability and traction performance.

Compared to the AWD system, which does not implement a torque distribution function between front wheels and rear wheels of a vehicle but does not perform torque distribution between a left wheel and a right wheel, a limited-slip differential (LSD) distributes torque to left and right driving wheels. This allows the vehicle to easily escape a rough road. The LSD also transmits torque to an outer wheel while suppressing slip of an inner wheel in turning of the vehicle to suppress understeer and improve handling performance of the vehicle. Particularly, the LSD does not obstruct drift driving of the vehicle.

Korean patent laid-open publication No, 10-2019-0127433 (Patent Document 1) discloses a control method for implementation of the drift driving state of a vehicle.

The control method disclosed in Patent Document 1 includes inducing slip, by a controller, so as to reduce a torque of an all-wheel drive (AWD) system distributed to the front wheels of a vehicle compared to other modes other than a drift mode, when the vehicle enters turning and is in a power-on state in the state in which the drift mode is selected. The control method also includes controlling, by the controller, a slip torque so as to allow the vehicle to enter drift by adding a slip control torque, depending on the lateral acceleration of the vehicle, to the torque distributed to the front wheels, when slip of the rear wheels of the vehicle occurs. The control method also includes maintaining, by the controller, a drift state of the vehicle by releasing the torque distributed to the front wheels when a countersteer state by a driver is confirmed.

Patent Document 1 discloses a method of assisting drift control of an AWD vehicle, which has both an AWD function and a LSD function, using a LSD system so as to allow the vehicle to perform drift driving.

According to the above conventional technology, the LSD system is used to control lateral driving force of the vehicle when drifting. In other words, slip of the vehicle is maintained and maintenance of drift of the vehicle is assisted by locking an axle, on which the LSD is mounted, and transmitting driving force to an outer wheel during turning so as to suppress slip of an inner wheel during drifting.

The LSD system simply synchronizes shafts to suppress slip of the inner wheel due to lateral load transfer when the vehicle turns. The LSD system does not generate an additional yaw moment of a side surface in the lateral direction before the vehicle enters drift and may thus not perform control of facilitating entry of the vehicle to drift.

Further, as the operating time of the LSD to maintain drift increases, thermal load applied to a brake element or a clutch element is excessively increased. Durability of a clutch may thereby deteriorate and the drift assistance function may thereby be limited.

The above information disclosed in this Background section is only to enhance understanding of the background of the disclosure. Therefore, the Background section may contain information that does not form the prior art that is already known to a person of ordinary skill in the art.

SUMMARY

The present disclosure has been made in an effort to solve the above-described problems associated with the prior art. It is an object of the present disclosure to provide a control method of drift driving of a vehicle that may improve durability problems of parts conventionally caused by maintaining drift and may support a drift entry assistance function and a drift maintenance assistance function while maximizing a driver's drift driving experience.

In one aspect, the present disclosure provides a control method of drift driving a vehicle. The control method includes determining, by a controller, whether or not drift entry assistance control is required based on vehicle driving state information, in a state in which the vehicle enters a drift mode. The control method of further includes performing, by the controller, the drift entry assistance control using a torque vectoring motor so that the vehicle reaches a drift driving state, upon determining that the drift entry assistance control is required. Performing the drift entry assistance control includes distributing a total torque to drive the vehicle in part to front wheels as a front wheel torque and in part to rear wheels as a rear wheel torque depending on a torque distribution ratio for drift entry assistance determined based on the vehicle driving state information. Performing the drift entry assistance control also includes determining a torque of the torque vectoring motor to perform torque distribution to a rear left wheel and a rear right wheel, based on a target yaw rate of the vehicle and an actual yaw rate of the vehicle detected by a sensor. Performing the drift entry assistance control also includes controlling a front wheel motor and a rear wheel motor to output the distributed front wheel torque and rear wheel torque, and simultaneously controlling the torque vectoring motor to output the determined torque.

In an embodiment, the control method may further include determining, by the controller, whether or not the vehicle enters the drift mode by a driver. The controller may also determine whether or not the drift entry assistance control is required, upon determining that the vehicle enters the drift mode by the driver.

In another embodiment, the controller may be set to perform the drift entry assistance control, upon determining that the drift entry assistance control is required within an entry grace time set from a point in time when a set required holding time passes, after the drift mode is turned on by the driver and an operating state of an operating device, manipulated by the driver to allow the vehicle to enter the drift mode, is maintained for the required holding time or more.

In still another embodiment, in determining whether or not the drift entry assistance control is required, the vehicle driving state information may include a lateral acceleration of the vehicle detected by a sensor and the actual yaw rate of the vehicle. The controller may determine whether or not predetermined drift entry assistance requirement conditions are satisfied based on the detected lateral acceleration of the vehicle and the detected actual yaw rate of the vehicle.

In yet another embodiment, the drift entry assistance requirement conditions may include drift entry assistance requirement conditions in a turning acceleration situation of the vehicle. The drift entry assistance requirement conditions in the turning acceleration situation may include a condition in which an absolute value of the lateral acceleration of the vehicle detected by a lateral acceleration sensor is greater than a predetermined first lateral acceleration set value. The drift entry assistance requirement conditions in the turning acceleration situation may also include a condition in which an absolute value of the actual yaw rate of the vehicle detected by a yaw rate sensor is greater than a predetermined first yaw rate set value, and a condition in which a driving torque to drive the vehicle is greater than a predetermined first torque set value.

In yet another embodiment, the drift entry assistance requirement conditions may further include drift entry assistance requirement conditions in a turning deceleration situation of the vehicle. The drift entry assistance requirement conditions in the turning deceleration situation may include a condition in which the absolute value of the lateral acceleration of the vehicle detected by the lateral acceleration sensor is greater than a predetermined second lateral acceleration set value. The drift entry assistance requirement conditions in the turning deceleration situation may also include a condition in which the absolute value of the actual yaw rate of the vehicle detected by the yaw rate sensor is greater than a predetermined second yaw rate set value, and a condition in which a braking torque to decelerate the vehicle is less than a predetermined second torque set value.

In another embodiment, the torque distribution ratio for drift entry assistance may be set to a value such that a greater regenerative braking torque is applied to the front wheels than the rear wheels in driving conditions at the same braking torque compared to in an eco mode, in a normal mode, and in a sport mode, corresponding other driving modes provided to the vehicle, in the turning deceleration situation of the vehicle, in distributing the total torque in part to the front wheels as the front wheel torque and in part to the rear wheels as the rear wheel torque.

In another embodiment, in the turning deceleration situation of the vehicle, in distributing the total torque in part to the front wheels as the front wheel torque and in part to the rear wheels as the rear wheel torque, the torque distribution ratio for drift entry assistance may be set to a value configured such that a greater regenerative braking torque is applied to the front wheels than the rear wheels.

In another embodiment, in the turning acceleration situation of the vehicle, in distributing the total torque in part to the front wheels as the front wheel torque and in part to the rear wheels as the rear wheel torque, the torque distribution ratio for drift entry assistance may be set to a value such that a greater torque is applied to the rear wheels than the front wheels in driving conditions at the same driving torque compared to in an eco mode, in a normal mode, and in a sport mode, corresponding other driving modes provided to the vehicle.

In another embodiment, in the turning acceleration situation of the vehicle, in distributing the total torque in part to the front wheels as the front wheel torque and in part to the rear wheels as the rear wheel torque, the torque distribution ratio for drift entry assistance may be set to a value such that a greater torque is applied to the rear wheels than the front wheels.

In another embodiment, in distributing the total torque in part to the front wheels as the front wheel torque and in part to the rear wheels as the rear wheel torque, the vehicle driving state information to determine the torque distribution ratio for drift entry assistance may include a driver request torque depending on a driver's driving input and the actual yaw rate of the vehicle detected by the sensor.

In another embodiment, in determining the torque of the torque vectoring motor, the torque of the torque vectoring motor is determined by Equation E1 below.

$$T_{TV} = K_p \times \left( \left( \dot{\psi}_{des} + K_{over} \right) - \dot{\psi}_{act} \right) \quad \text{[Equation E1]}$$

Here, $T_{TV}$ may indicate the torque of the torque vectoring motor, $K_p$ may indicate a predetermined proportional constant, $\dot{\psi}_{des}$ may indicate the target yaw rate, $K_{over}$ may indicate an offset of the target yaw rate, and $\dot{\psi}_{act}$ may indicate the actual yaw rate of the vehicle detected by a yaw rate sensor.

In another embodiment, the offset may be determined based on a lateral acceleration detected by a lateral acceleration sensor, and the actual yaw rate of the vehicle detected by the yaw rate sensor.

In another embodiment, the control method may further include determining, by the controller, whether or not predetermined drift maintenance assistance execution conditions are satisfied based on the vehicle driving state information, when the vehicle reaches the drift driving state. The control method may further include performing, by the controller, control configured to assist the vehicle to maintain the drift driving state using the torque vectoring motor, upon determining that the drift maintenance assistance execution conditions are satisfied. Performing the control configured to assist the vehicle to maintain the drift driving state may include determining a target speed of one of the rear left wheel and the rear right wheel corresponding to an inner wheel during turning of the vehicle to achieve speed synchronization between the inner wheel and a remaining one of the rear left wheel and the rear right wheel corresponding to an outer wheel during turning of the vehicle. Performing the control to assist the vehicle to maintain the drift driving state may further include controlling a speed and a torque of the torque vectoring motor to achieve the speed synchronization between the inner wheel and the outer wheel using the target speed of the inner wheel.

In another embodiment, in determining whether or not the drift maintenance assistance execution conditions are satisfied, the vehicle driving state information may include a lateral acceleration, the actual yaw rate, and a steering angle of the vehicle detected by respective sensors. The drift maintenance assistance execution conditions may include a condition in which an absolute value of the detected lateral acceleration of the vehicle is greater than a predetermined fourth lateral acceleration set value. The drift maintenance assistance execution conditions may further include a condition in which an absolute value of the detected actual yaw rate of the vehicle is greater than a predetermined fourth yaw rate set value. The drift maintenance assistance execution conditions may further include a condition in which a countersteer state of the vehicle is maintained for a first set time after determining the countersteer state of the vehicle from the detected actual yaw rate and steering angle of the vehicle.

In another embodiment, in controlling the speed and the torque of the torque vectoring motor to achieve the speed synchronization, a target torque configured to control the torque vectoring motor may be determined as a sum of a feedforward torque based on a load transfer between a rear left wheel and a rear right wheel, and a feedback torque based on proportional-integral-derivative (PID) control using a speed error between the rear left wheel and the rear right wheel. The feedforward torque may be determined using a normal force of the rear left wheel and a normal force of the rear right wheel, estimated based on the lateral acceleration of the vehicle detected by the sensor.

In another embodiment, the feedforward torque may be determined by Equation E2 below.

$$T_{TV,FF} = \left(\frac{F_{N,RL}}{F_{N,RL} + F_{N,RR}} - 0.5\right) \times K_{speed} \qquad \text{[Equation E2]}$$

Here, $T_{TV,FF}$ may indicate the feedforward torque, $F_{N,RL}$ may indicate the normal force of the rear left wheel, $F_{N,RR}$ may indicate the normal force of the rear right wheel, and $K_{speed}$ may be a torque factor for torque vectoring control determined to apply an additional yaw moment to the vehicle in a turning direction depending on a normal force ratio between the rear left wheel and the rear right wheel.

In another embodiment, the torque factor for torque vectoring control may be determined as a value based on a difference value between a rear left wheel speed and a rear right wheel speed detected by wheel speed sensor, and a vehicle speed.

In another embodiment, the torque factor for torque vectoring control may be set to a higher value, as the difference value between the rear left wheel speed and the rear right wheel speed increases.

Other aspects and embodiments of the disclosure are discussed below.

The above and other features of the disclosure are discussed below.

BRIEF DESCRIPTION OF THE DRAWINGS

The above and other features of the present disclosure are described in detail with reference to certain embodiments thereof illustrated in the accompanying drawings, which are given hereinbelow by way of illustration only, and thus are not limitative of the present disclosure, and wherein.

Figure 1:
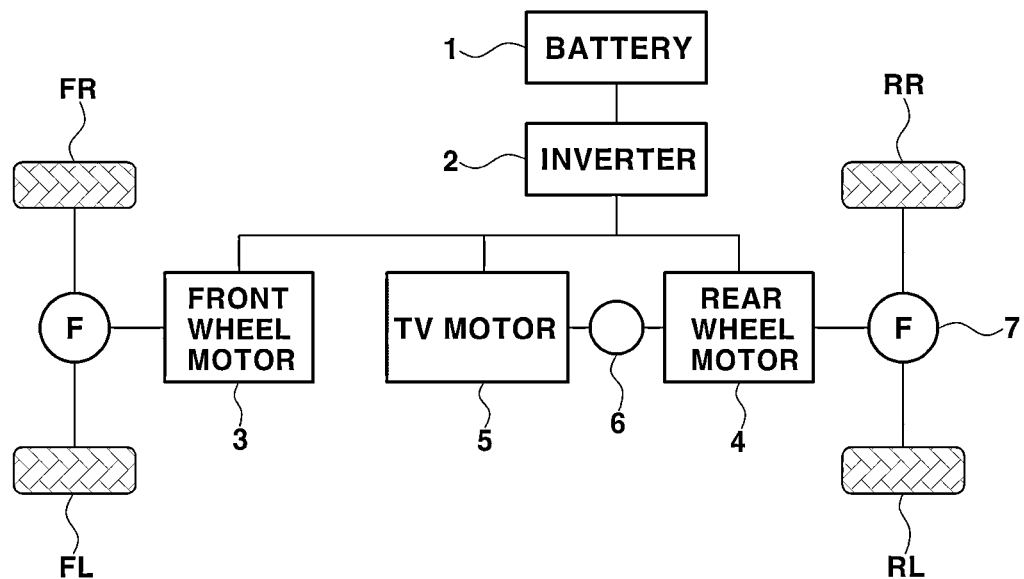
FIGS. 1-3 are views illustrating one example of a configuration of a powertrain of a vehicle to which an electric-powered torque vectoring apparatus usable in the present disclosure is applied.

It should be understood that the appended drawings are not necessarily drawn to scale, presenting a somewhat simplified representation of various features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Hereinafter reference is made in detail to various embodiments of the present disclosure, examples of which are illustrated in the accompanying drawings and described below. Specific structural or functional descriptions in embodiments of the present disclosure set forth in the description which follows are given to describe embodiments of the present disclosure, and the present disclosure may be embodied in many alternative forms. Further, it should be understood that the present disclosure should not be construed as being limited to the embodiments set forth herein. The embodiments of the present disclosure are provided only to completely disclose the disclosure and cover modifications, equivalents, or alternatives, which come within the scope and technical range of the disclosure.

In the following description of the embodiments, terms, such as "first" and "second", are used only to describe various elements, and these elements should not be construed as being limited by these terms. These terms are used only to distinguish one element from other elements. For example, a first element described hereinafter may be termed a second element, and similarly, a second element described hereinafter may be termed a first element, without departing from the scope of the disclosure.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there may be no intervening elements or layers present. Other words used to describe relationships between elements should be interpreted in a like fashion, e.g., "between" versus "directly between," "adjacent" versus "directly adjacent," and the like.

Wherever possible, the same reference numbers are used throughout the drawings to refer to the same or like parts. The terminology used herein is for the purpose of describing particular embodiments only and is not intended to be limiting. As used herein, singular forms may be intended to include plural forms as well, unless the context clearly indicates otherwise. The terms "comprises," "comprising," "including," and "having" and variations thereof are inclusive and therefore specify the presence of stated features, integers, operations, operations, elements, components, and/or combinations thereof. These terms do not preclude the presence or addition of one or more other features, integers, operations, operations, elements, components, and/or combinations thereof. When a component, device, element, or the like of the present disclosure is described as having a purpose or performing an operation, function, or the like, the component, device, or element should be considered herein as being "configured to" meet that purpose or to perform that operation or function.

The present disclosure relates to a control method for drift driving a vehicle that may improve durability problems of parts conventionally caused by maintaining drift and may support a drift entry assistance function and a drift maintenance assistance function while maximizing a driver's drift driving experience.

The present disclosure relates to a method of implementing the drift entry assistance function and the drift maintenance assistance function of the vehicle using a torque vectoring (TV) apparatus, which may distribute power to a left wheel and a right wheel of the vehicle together with driving motors configured to drive the vehicle.

For this purpose, the present disclosure may be applied to an electric vehicle provided with such a torque vectoring (TV) apparatus. Further, the present disclosure may be applied to a four-wheel drive (4WD or AWD) vehicle provided with a front wheel motor configured to drive front wheels and a rear wheel motor configured to drive rear wheels.

In the present disclosure, the torque vectoring apparatus may be an electric-powered torque vectoring apparatus, which may include a torque vectoring (TV) motor. In the present disclosure, the electric-powered torque vectoring apparatus may be a known torque vectoring apparatus having a known hardware configuration.

Figure 2:
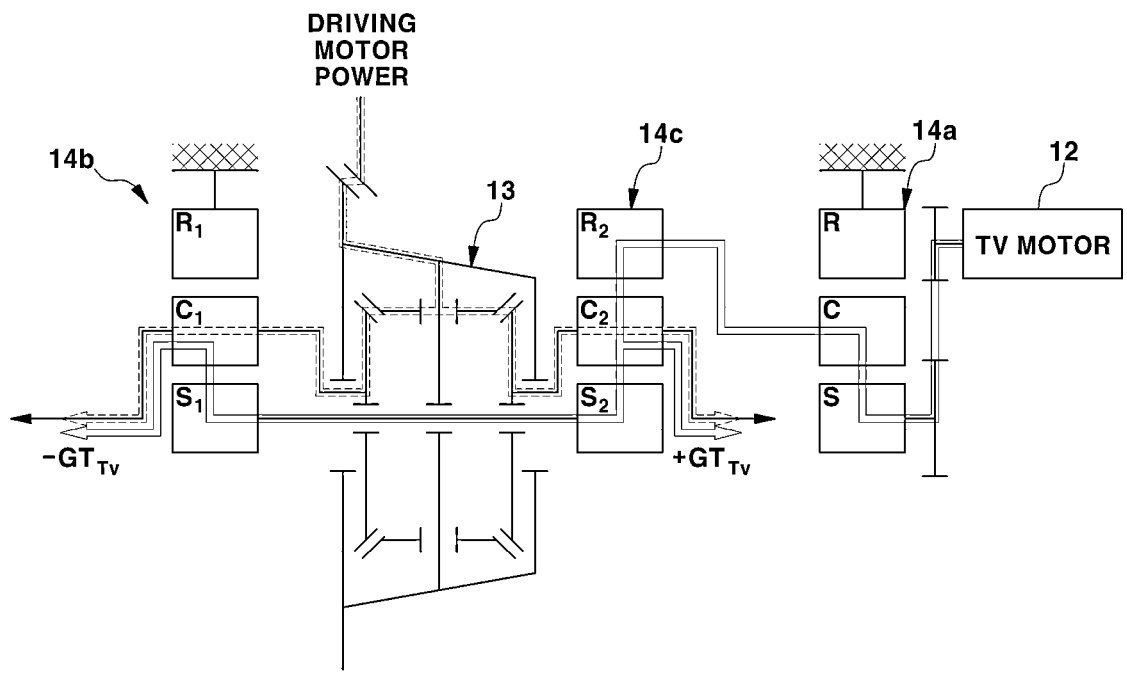
Figure 3:
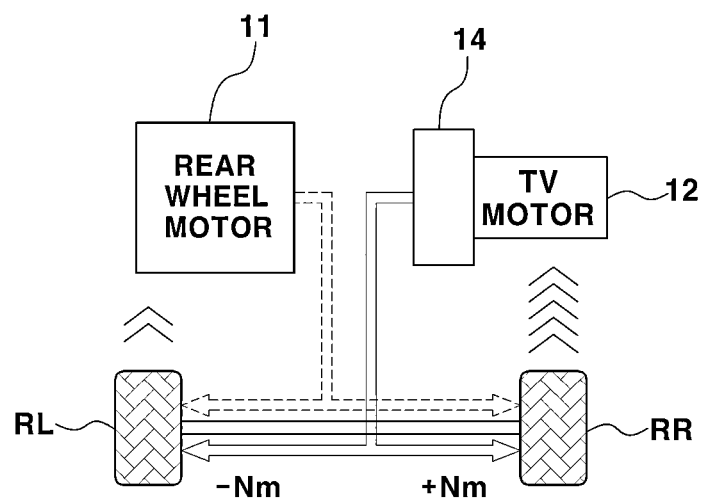

FIGS. 1-3 are views illustrating one example of the configuration of a powertrain of a vehicle to which an electric-powered torque vectoring apparatus usable in the present disclosure is applied. In the example of FIG. 1, driving motors configured to drive the vehicle include a front wheel motor 3 and a rear wheel motor 4.

In the vehicle to which the present disclosure is applied, a torque vectoring (TV) motor 5 is mounted together with the driving motors. Hereinafter, the torque vectoring (TV) motor 5 is abbreviated as the "TV motor".

The torque vectoring apparatus is an apparatus configured to perform torque distribution to a left wheel and a right wheel. In the example of FIG. 1, the TV motor 5 is connected to a rear left wheel RL and a rear right wheel RR so as to transmit power thereto. The torque vectoring apparatus performs torque distribution to the rear left wheel RL and the rear right wheel RR.

Figure 7:
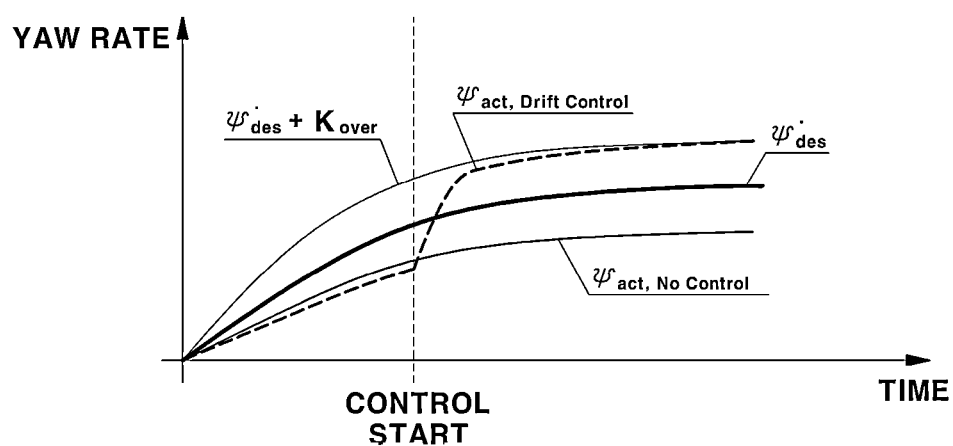
FIG. 7 is a graph representing a state in which a yaw rate of the vehicle is controlled to assist entry of the vehicle to drift according to one embodiment of the present disclosure.

In FIG. 7, reference numeral '7' indicates a reducer and a differential together, and more particularly, indicates the reducer and the differential disposed at the output side of the rear wheel motor 4 among the driving motors. In the vehicle to which the present disclosure is applied, the differential may be an open differential (OD).

Referring to FIG. 1, a battery 1 is connected to the driving motors, i.e., the front wheel motor 3 and the rear wheel motor 4, and the TV motor 5 via an inverter 2 to be chargeable and dischargeable. The respective motors 3, 4 and 5 are operated by power from the battery 1 via the inverter 2. Although FIG. 1 illustrates the inverter 2 as one integrated element, inverters for the respective motors 3, 4 and 5, such as a front wheel inverter and a rear wheel inverter, may be individually provided.

The front wheel motor 3 and the rear wheel motor 4 may be connected to left wheels FL and RL and right wheels FR and RR to enable power transmission thereto. The vehicle may be driven to travel due to a torque applied from the front wheel motor 3 to the front left wheel FL and the front right wheel FR and a torque applied from the rear wheel motor 4 to the rear left wheel RL and the rear right wheel RR.

Further, a torque vectoring mechanism 6 including planetary gear sets may be connected to the output side of the TV motor 5. A torque generated by the TV motor 5 may be distributed and applied to the rear left wheel RL and the rear right wheel RR through the torque vectoring mechanism 6. Torque vectoring may be performed thereby.

In a general electric vehicle, when a vehicle control unit (VCU) 30 (in FIG. 4) generates motor torque commands from vehicle driving state information acquired by a driving information detector 21 including sensors, and outputs the motor torque commands, a motor control unit (MCU) 40 (in FIG. 3) controls driving of the inverter 2 depending on the motor torque commands for the respective motors 3, 4 and 5 output from the vehicle control unit VCU 30.

Further, when power of the battery 1 is applied to the motors 3, 4 and 5 through the inverter 2, direct current (DC) of the battery 1 is converted into three-phase alternating current (AC) by the inverter 2 operated depending on the motor torque commands for the respective motors 3, 4 and 5, and is applied to the respective motors 3, 4 and 5. Thus, the corresponding motors 3, 4 and 5 are driven to output desired torques. Consequently, the torques output from the motors 3, 4 and 5 are applied to the left wheels FL and RL and the right wheels FR and RR through the reducer and the differential 7.

Moreover, the vehicle to which the present disclosure is applied may be a hybrid electric vehicle. When a target vehicle to which the present disclosure is applied is a hybrid electric vehicle, an engine which is not shown, and a rear wheel motor may be used as rear wheel driving devices. In this case, an engine clutch (not shown) may be disposed between the engine and the rear wheel motor, and a transmission may be disposed at the output side of the rear wheel motor.

In the hybrid electric vehicle in which the transmission is disposed at the output side of a driving motor (i.e., the rear wheel motor), (i.e., a transmission mounted electric device (TMED)-type hybrid electric vehicle) a starter-generator directly connected to the engine to enable power transmission thereto, (i.e., a hybrid stater and generator (HSG)) may be used as a TV motor.

Further, as shown in FIG. 2, the torque vectoring apparatus may include a combination of a differential 13 to which power of the driving motor (the rear wheel motor) is transmitted through a reducer, which is not shown, a TV motor 12, and a plurality of planetary gear sets 14a, 14b and 14c disposed between the TV motor 12 and driving wheels (rear wheels).

As shown in FIG. 2, the plurality of planetary gear sets 14a, 14b and 14c may include a first planetary gear set 14a disposed at the output side of the TV motor 12, a second planetary gear set 14b disposed between the differential 13 and the rear left wheel, and a third planetary gear set 14c disposed among the first planetary gear set 14a, the rear right wheel and the differential 13.

FIG. 3 is a view illustrating a state in which torques are transmitted to the left wheel RL and the right wheel RR by a rear wheel motor 11 among driving motors and the TV motor 12. It may be confirmed that a torque vectoring mechanism 14, which is a power transmission mechanism including planetary gear sets, is disposed at the output side of the TV motor 12.

In an example in which a torque vectoring apparatus includes a differential, a TV motor, and a plurality of planetary gear sets, when driving wheels are rear wheels, a torque transmitted to the rear left wheel RL and a torque transmitted to the rear right wheel RR may be calculated by Equation 1 and Equation 2 below.

$$T_{RL} = \frac{1}{2} \times A \times T_{Main} + G \times T_{Tv} \quad \text{[Equation 1]}$$

$$T_{RR} = \frac{1}{2} \times A \times T_{Main} - G \times T_{Tv} \quad \text{[Equation 2]}$$

Here, $T_{RL}$ indicates a torque applied to the rear left wheel (i.e., a rear left wheel torque) and $T_{RR}$ indicates a torque applied to the rear right wheel (i.e., a rear right wheel torque).

Also, $T_{Main}$ indicates a torque output from the rear wheel motor 11, and $T_{TV}$ indicates a torque output from the TV motor 12 (i.e., a TV motor torque). Further, A indicates a rear wheel motor gear ratio, and G indicates a TV motor gear ratio.

A TV motor speed may be calculated by Equation 3 below.

$$W_{TV} = G \times (w_{RL} - w_{RR}) \quad \text{[Equation 3]}$$

Here, $w_{TV}$ indicates the TV motor speed, $w_{RL}$ indicates a rear left wheel speed, and $w_{RR}$ indicates a rear right wheel speed.

Referring to the example of FIG. 3, the torque of the TV motor 12 is transmitted to the rear right wheel RR as a positive torque +Nm (a torque in a driving direction) by the torque vectoring mechanism 14. The torque of the TV motor 12 is transmitted to the rear left wheel RL as a negative torque −Nm (a torque in a braking direction), which is a torque in the direction opposite to the rear right wheel RR, by the torque vectoring mechanism 14.

Figure 4:
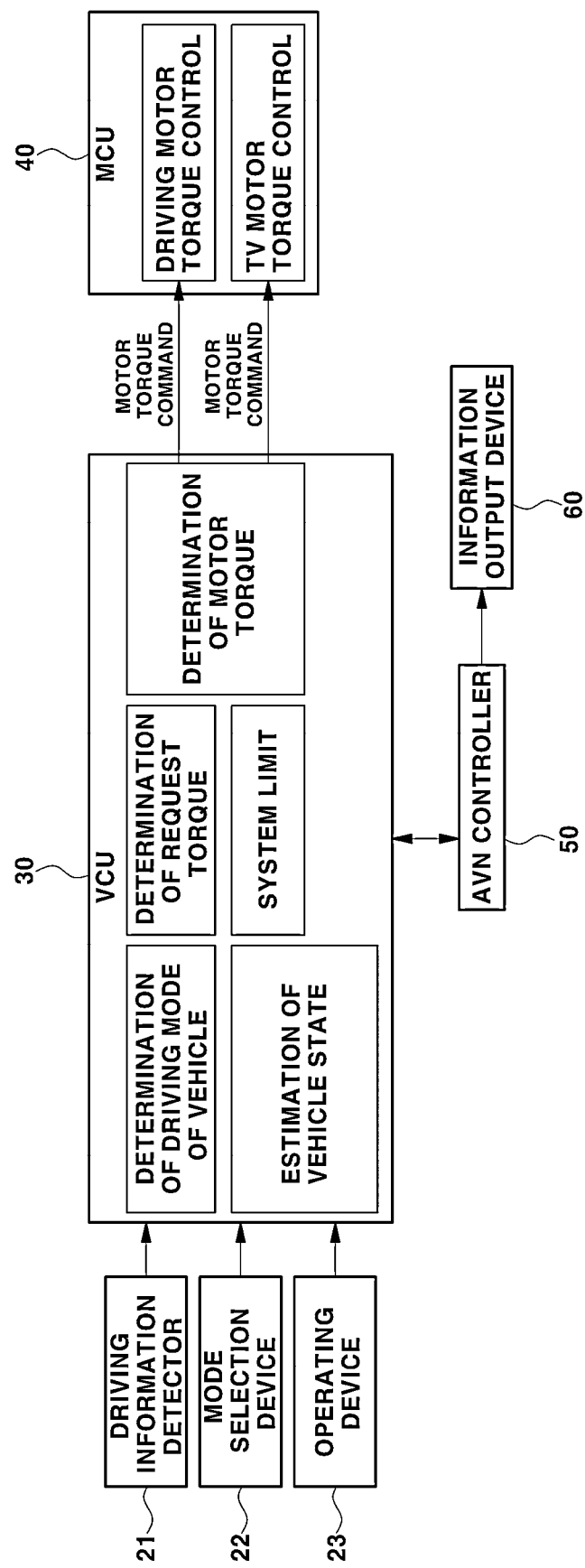
FIG. 4 is a block diagram showing a control apparatus configured to perform a control process of drift driving of the vehicle according to one embodiment of the present disclosure.

FIG. 4 is a block diagram showing a control apparatus configured to perform a control process of drift driving of the vehicle according to one embodiment of the present disclosure. Control of drift driving of the vehicle according to the present disclosure may be performed by cooperative control executed by a plurality of controllers provided in the vehicle having the TV motor.

FIG. 4 shows cooperative control performed by the vehicle control unit (referred to hereinafter as 'VCU') 30 and the motor control unit (referred to hereinafter as 'MCU') 40, and an audio, video and navigation (AVN) control unit 50.

Basically, the VCU 30 acquires the vehicle driving state information, detected by the driving information detector 21 of the vehicle, in real time, estimates a vehicle state and determines a vehicle driving mode based on the acquired real-time vehicle driving state information, and determines a total required torque.

Here, the vehicle driving state information is information indicating a vehicle driving state, such as a vehicle state, a driver's driving input state, and the like, and includes an accelerator pedal input value (an APS value), a brake pedal input value (a BPS value), a steering angle (an SAS value), wheel speeds, motor speeds, and the like.

The vehicle driving state information may further include a vehicle speed, a longitudinal acceleration and a lateral acceleration of the vehicle, yaw rate information, and the like. Here, the vehicle speed may be acquired from signals from wheel speed sensors. Further, the longitudinal acceleration and the lateral acceleration may be acquired from signals from a longitudinal acceleration sensor and a lateral acceleration sensor, and a yaw rate may be acquired from a signal from a yaw rate sensor.

Further, the driving information detector 21 may include an accelerator pedal sensor configured to detect an accelerator pedal input value by a driver, a brake pedal sensor configured to detect a brake pedal input value by the driver, and a steering angle sensor (SAS) configured to detect a steering angle as a steering wheel input value by the driver.

In addition, the driving information detector 21 may further include the wheel speed sensors configured to detect respective wheel speeds, the lateral acceleration sensor configured to detect a lateral acceleration of the vehicle, the longitudinal acceleration sensor configured to detect a longitudinal acceleration of the vehicle, and the yaw rate sensor configured to detect a yaw rate of the vehicle.

The accelerator pedal sensor and the brake pedal sensor may be an accelerator pedal sensor (APS) and a brake pedal sensor (BPS), which are generally mounted in an accelerator pedal and a brake pedal, respectively. The motor speed sensors may be resolvers, which are generally mounted in the driving motors (the front wheel motor and the rear wheel motor) and the TV motor, respectively.

The VCU 30 determines the total required torque depending on a driver's driving intention based on the real-time vehicle driving state information. Further, when the total required torque is determined, the VCU 30 applies a system limit value to the total required torque, determines final motor torques in consideration of battery and electric field load situations or the like, and determines the motor torque commands from the final motor torques.

The VCU 30 determines motor torque commands for the driving motors (the front wheel motor and the rear wheel motor) and a motor torque command for the TV motor as the motor torque commands and transmits the determined motor torque commands to the MCU 40.

The MCU 40 controls operation of the front wheel motor, the rear wheel motor, and the TV motor through the inverter based on motor efficiencies and mapped values depending on the motor torque commands received from the VCU 30.

Here, the MCU 40 performs switching control of switching elements in a power module in the inverter so that the front wheel motor, the rear wheel motor, and the TV motor may output desired torques depending on the motor torque commands. DC from the battery may thereby be converted into three-phase AC by the inverter and the three-phase AC may be applied to the respective motors.

Figure 5:
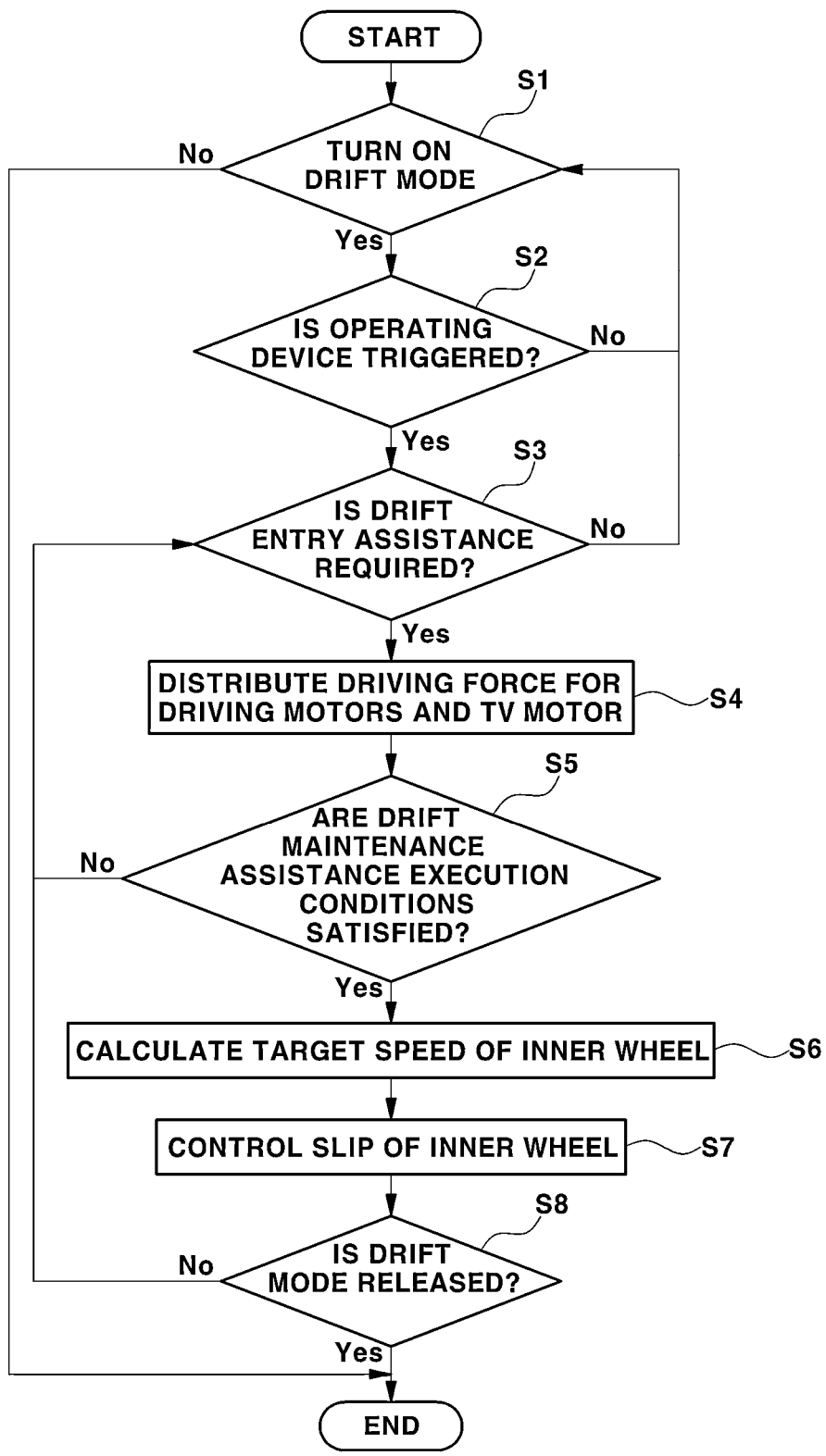
FIG. 5 is a flowchart representing the control process according to one embodiment of the present disclosure.

FIG. 5 is a flowchart representing the control process according to one embodiment of the present disclosure. Referring to this figure, the control process according to one embodiment of the present disclosure is described below. Hardware elements in the following description will be described below with reference to FIGS. 1-4.

The control process according to one embodiment of the present disclosure may be performed by the plurality of control units provided in the vehicle or may be performed by one integrated control element instead of the plurality of control units.

The above-described plurality of control units and the integrated control element may be commonly called controllers. The control processes according to the present disclosure, which are described below, may be performed by these controllers.

In the following description, controllers may include a plurality of control units, i.e., the VCU 30, the MCU 40, and the AVN control unit 50. The plurality control units 30, 40 and 50 may be commonly called the controllers, unless the plurality control units 30, 40 and 50 are referred to separately.

The control process according to one embodiment of the present disclosure includes determining whether or not the vehicle enters the drift mode by driver selection ('determination of entry of the vehicle to the drift mode'). The control process may further include assisting entry of the vehicle to drift so that the vehicle reaches a drift driving state ('assistance of entry of the vehicle to drift). The control process may further include assisting maintenance of drift of the vehicle so that the vehicle maintains the drift driving state ('assistance of maintenance of drift of the vehicle). The control process may further include determining whether or not the vehicle releases the drift mode by driver selection ('determination of release of the drift mode').

First, in the present disclosure, the drift mode may be provided as one of driving modes of the vehicle. For example, the driving modes of the vehicle may include the eco mode, the normal mode, the sport mode, the snow mode, and the sand mode, which are generally known modes, and may additionally include the drift mode in which control of the drift driving of the vehicle is performed.

In one embodiment of the present disclosure, the drift mode is a mode in which the vehicle exhibits extreme power performance and implements a dynamic behavior state by differentiating the dynamic behavior of the vehicle from the dynamic behavior of the vehicle in a general driving situation. The drift mode is included as one independent mode in the driving modes of the vehicle to which the present disclosure is applied.

In one embodiment of the present disclosure, in determining whether or not the vehicle enters the drift mode by driver selection ('determination of entry of the vehicle to the drift mode'), whether or not the vehicle enters the drift mode by a driver's manipulation of an operating element provided in the vehicle is determined. Whether or not the vehicle enters the drift mode includes a process of determining, by the controller (VCU) 30, whether or not the drift mode is selected by the driver.

In determining whether or not the vehicle enters the drift mode, the driver may turn on the drift mode by selecting the drift mode during driving in a driving mode by operating a mode selection device 22 provided in the vehicle.

In the state in which the driver turns on the drift mode by selecting the drift mode, the vehicle may enter the drift mode. Drift assistance functions performed by control of drift driving of the vehicle according to the present disclosure may be activated.

Further, in one embodiment of the present disclosure, the controller (VCU) 30 determines whether or not the drift mode is turned on (in Operation S1 in FIG. 5). The controller 30 also determines whether or not the drift mode is triggered from a state in which the driver additionally operates an operating device 23 for entering the drift mode (in Operation S2 in FIG. 5).

It may be determined that, when the controller (VCU) 30 determines that the drift mode is triggered, the driver finally selects entry to the drift mode.

When the controller (VCU) 30 determines that the vehicles enters the drift mode by driver selection through the above-described process, the controller (VCU) 30 provides the drift assistance functions, i.e., the drift entry assistance function and the drift maintenance assistance function, which is described below.

The operating device 23 is provided in the vehicle so that the driver may manipulate the operating device 23 and may be a device that outputs n electrical signal depending on driver manipulation, for example, a paddle shift.

The paddle shift provided in the vehicle may be connected to the controller, for example, the VCU 30, so that an electrical signal may be input thereto. The electrical signal output from the paddle shift may be input to the VCU 30.

In one embodiment of the present disclosure, when the operating device 23 outputs an electrical signal depending on driver manipulation, the controller (VCU) 30 may recognize the operating state of the operating device 23 by receiving the electrical signal output from the operating device 23 and may simultaneously determine triggering of the drift mode through the operating device 23.

Figure 6:
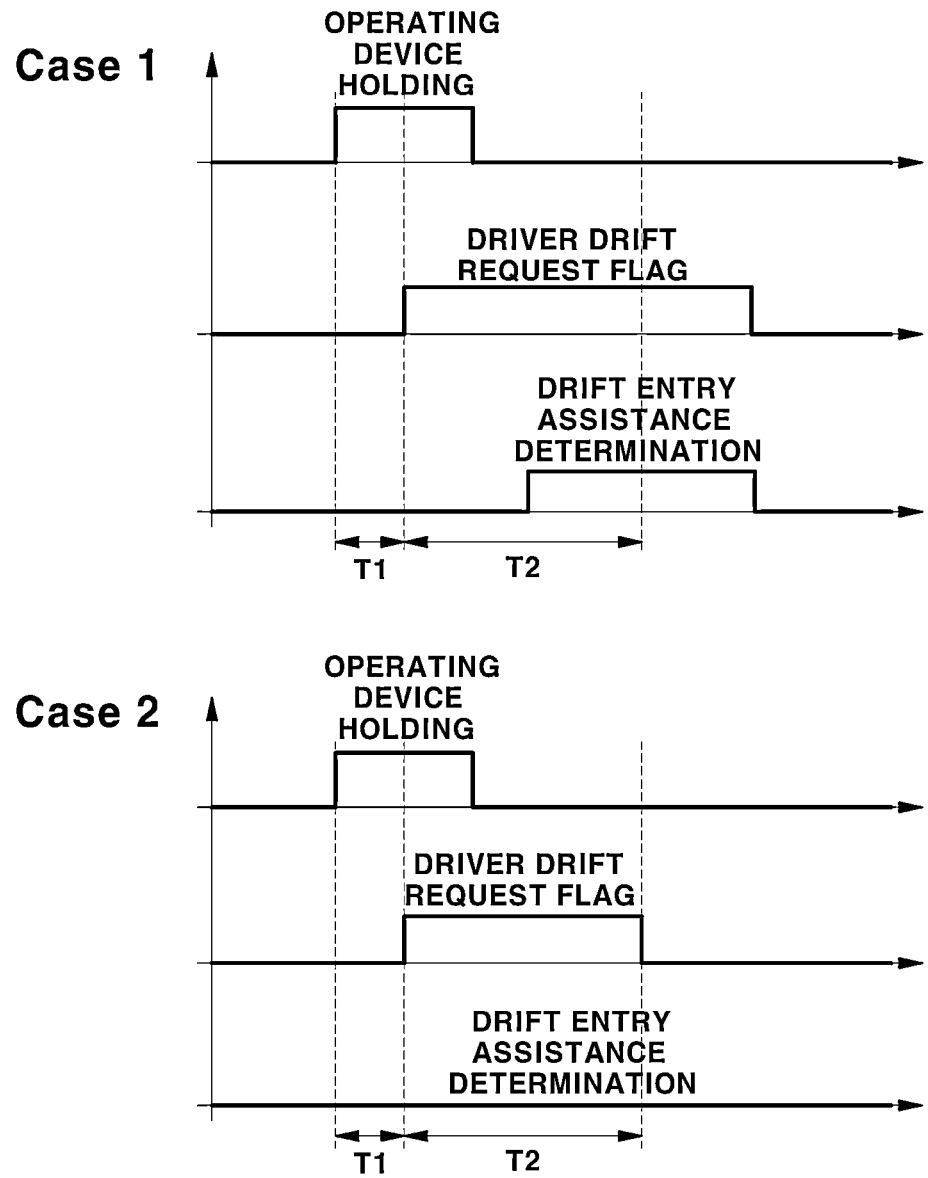
FIG. 6 is a view representing determining whether or not the vehicle enters a drift mode according to one embodiment of the present disclosure.

FIG. 6 is a view representing determining whether or not the vehicle enters the drift mode according to one embodiment of the present disclosure. In this figure, T1 indicates a required holding time and T2 indicates an entry grace time.

In one embodiment of the present disclosure, when the operating state of the paddle shift, i.e., the operating device 23, is maintained for a designated time or more after the driver operated the paddle shift, the VCU 30 may determine triggering of the drift mode by recognizing the holding state of the paddle shift from the input state of the electrical signal from the paddle shift. Here, the designated time is the required holding time T1 shown in FIG. 6.

When the driver holds the operating state of the paddle shift for the predetermined time T1 or more, the VCU 30 determines that there is a drift request by the driver and transmits a drift request flag to the AVN controller 50.

The AVN controller 50 received the drift request flag informs the driver of whether or not the drift mode is activated through an information output device 60, such as an instrument cluster, a display, or a speaker of the vehicle. Thereby, the driver may recognize whether or not the drift mode is activated.

Here, the VCU 30 releases the drift request by the driver, when the VCU 30 does not determine whether or not drift entry assistance control, which is described below, is required or determines that drift entry release conditions are satisfied, within the predetermined entry grace time T2 from a point in time when the predetermined time T1 passes after manipulation of the operating device 23.

In FIG. 6, Case 1 indicates a case when it is determined that drift entry assistance control is required within the entry grace time T2. Case 2 indicates a case when whether or not drift entry assistance control is required is not determined within the entry grace time T2.

Further, in one embodiment of the present disclosure, when the vehicle has entered the drift mode by the driver, a known electronic stability control (ESC) function for stably controlling the posture of the vehicle may be set to be completely released from the corresponding vehicle, in order to prevent performance conflict with a slip control function due to braking.

After the determination as to whether or not the vehicle enters the drift mode, the controller (VCU) 30 assists entry of the vehicle to drift so that the vehicle actually reaches a drift driving state.

In assisting the entry of the vehicle to drift, the controller (VCU) 30 determines whether or not drift entry assistance control is required (in Operation S3 in FIG. 5). For this purpose, the controller (VCU) 30 determines whether or not drift entry assistance control is required in consideration of an acceleration state or a deceleration state of the vehicle during turning depending on operation of driving input devices, such as the steering wheel, the accelerator pedal, and the brake pedal.

The drift driving state happens when the slip angle of the rear wheels is greater than the slip angle of the front wheels due to rear wheel slip caused during turning of the vehicle. Such rear wheel slip is caused in a turning acceleration situation of the vehicle in which the rear wheels slip is caused due to excessive driving force of the rear wheels during turning of the vehicle. Such rear wheel slip is also caused in a turning deceleration situation of the vehicle in which the rear wheels slip is caused due to lack of tire gripping strength of the rear wheels caused by movement of load to the front part of the vehicle by deceleration of the vehicle during turning of the vehicle.

The turning acceleration situation and the turning deceleration situation may be determined based on values about a vehicle driving state, detected by the sensors, occurred when the driver operates the steering wheel and the accelerator pedal or the brake pedal.

Here, the values about the vehicle driving state detected by the sensors may include the lateral acceleration of the vehicle detected by the lateral acceleration sensor, and the actual yaw rate of the vehicle detected by the yaw rate sensor.

In one embodiment of the present disclosure, the controller (VCU) 30 determines whether or not predetermined drift entry assistance requirement conditions are satisfied from the vehicle driving state information acquired by the driving information detector 21.

The drift entry assistance requirement conditions include predetermined drift entry assistance requirement conditions in the turning acceleration situation and predetermined drift entry assistance requirement conditions in the turning deceleration situation. The drift entry assistance requirement conditions may further include whether or not drift entry assistance control is required is determined by confirming whether or not the above two conditions are satisfied.

In one embodiment of the present disclosure, the drift entry assistance requirement conditions in the turning acceleration situation include a condition in which the absolute value of the lateral acceleration of the vehicle detected by the lateral acceleration sensor is greater than a predetermined first lateral acceleration set value. The drift entry assistance requirement conditions in the turning acceleration situation may further include a condition in which the absolute value of the actual yaw rate of the vehicle detected by the yaw rate sensor is greater than a predetermined first yaw rate set value. The drift entry assistance requirement conditions in the turning acceleration situation include a condition in which a driving torque (a positive torque value) for driving the vehicle is greater than a predetermined first torque set value (a positive torque value).

The driving torque may be a driver request torque (a total request torque) determined based on the accelerator pedal input value detected by the accelerator pedal sensor and may be implemented as a positive (+) torque value. Here, the first torque set value may be set to a positive (+) torque value.

The controller (VCU) 30 may determine that drift entry assistance control is required from the current turning acceleration situation, when it is determined that all of the drift entry assistance requirement conditions in the turning acceleration situation are satisfied.

Further, in one embodiment of the present disclosure, the drift entry assistance requirement conditions in the turning deceleration situation include a condition in which the absolute value of the lateral acceleration of the vehicle detected by the lateral acceleration sensor is greater than a predetermined second lateral acceleration set value. The drift entry assistance requirement conditions in the turning deceleration situation may further include a condition in which the absolute value of the actual yaw rate of the vehicle detected by the yaw rate sensor is greater than a predetermined second yaw rate set value. The drift entry assistance requirement conditions in the turning deceleration situation include a condition in which a braking torque (a negative torque value) for decelerating the vehicle is less than a predetermined second torque set value (a negative torque value).

The braking torque may be a driver request torque (a total request torque) determined based on information detected by the driving information detector 21 and may be implemented as a negative (−) torque value. The second torque set value may be set to a negative (−) torque value.

The braking torque implemented as a negative (−) torque value may include a regenerative torque for the motors determined by the controller (VCU) 30 depending on the brake pedal input and may include a regenerative torque in a coasting situation in which there is no brake pedal input.

Further, the braking torque may be an initial driver request torque determined from driver's driving input information detected by the sensors of the driving information detector 21, such as the accelerator pedal sensor (APS), the brake pedal sensor (BPS), and the steering angle sensor (SAS). During a drift entry assistance process according to the present disclosure, a driver's drift intention is determined from the initial driver request torque.

The controller (VCU) 30 may determine that drift entry assistance control is required from the current turning deceleration situation, when it is determined that all of the drift entry assistance requirement conditions in the turning deceleration situation are satisfied.

Further, in one embodiment of the present disclosure, the controller (VCU) 30 may determine that drift entry assistance control is required when it is determined that the current driving state of the vehicle satisfies the drift entry assistance requirement conditions in the turning acceleration situation or satisfies the drift entry assistance requirement conditions in the turning deceleration situation.

In other words, the controller (VCU) 30 may determine that drift entry assistance control is required when it is determined that any one of the drift entry assistance requirement conditions in the turning acceleration situation and the drift entry assistance requirement conditions in the turning deceleration situation are satisfied based on the vehicle driving state information.

In the drift entry assistance requirement conditions in the turning acceleration situation and the drift entry assistance requirement conditions in the turning deceleration situation, the first lateral acceleration set value and the second lateral acceleration set value, and the first yaw rate set value and the second yaw rate set value, may be the same value or may be different values.

Further, when the controller (VCU) 30 determines that predetermined drift entry assistance release conditions are satisfied, the controller (VCU) 30 releases drift entry assistance, and returns to the previous operation, i.e., determining whether or not the vehicle enters the drift mode.

In one embodiment of the present disclosure, the drift entry assistance release conditions may include a condition in which the absolute value of the lateral acceleration of the vehicle is less than a predetermined third lateral acceleration set value. The drift entry assistance release conditions may further include a condition in which the absolute value of the actual yaw rate of the vehicle is less than a predetermined third yaw rate set value. The drift entry assistance release conditions may further include a condition in which the driving torque (the positive torque value) is equal to or less than the first torque set value (the positive torque value) or the braking torque (the negative torque value) is equal to or greater than the second torque set value (the negative torque value).

In one embodiment of the present disclosure, when all of the drift entry assistance release conditions are satisfied, the controller (VCU) 30 releases drift entry assistance and returns to the previous operation, i.e., determining whether or not the vehicle enters the drift mode.

The third lateral acceleration set value may be the same as or different from the first lateral acceleration set value or the second lateral acceleration set value. The third yaw rate set value may be the same as or different from the first yaw rate set value or the second yaw rate set value.

As such, in assisting entry of the vehicle to drift, the controller (VCU) 30 determines whether or not drift entry assistance control is required and performs drift entry assistance control so that the vehicle may reach the drift driving state, upon determining that drift entry assistance control is required.

In one embodiment of the present disclosure, upon determining that drift entry assistance control is required so that the vehicle may reach the drift driving state, the controller (VCU) 30 may assist entry of the vehicle to drift. The controller 30 may do so by causing greater slip of the rear wheels and causing greater oversteer of the vehicle by distributing a torque (driving force or regenerative braking force) to the driving motors (i.e., the front wheel motor and the rear wheel motor) and the TV motor so as to execute drift entry assistance (in Operation S4 in FIG. 5).

Here, in order to assist entry of the vehicle to drift, the controller (VCU) 30 may adjust a torque distribution ratio between the front wheels and the rear wheels of the vehicle so as to cause greater slip of the rear wheels by the driving motors depending on the adjusted torque distribution ratio.

Here, greater oversteer of the vehicle may be caused by applying an additional yaw moment to the TV motor.

The driving motors may include the front wheel motor 3 (in FIG. 1), the rear wheel motor 4 (in FIG. 1), and the TV motor 5 (in FIG. 1) may be the motor of the torque vectoring apparatus, which distributes power to the rear left wheel RL and the rear right wheel RR (with reference to FIG. 1).

In control of the driving motors, a total torque for the driving motors is distributed in part to the front wheels as a front wheel torque and in part to the rear wheels as a rear wheel torque. The total torque for the driving motors before distribution is a total torque required to drive the vehicle, i.e., a final motor torque determined based on the driver request torque by the controller (VCU) 30.

Such a final motor torque is distributed as the front wheel torque and the rear wheel torque depending on the torque distribution ratio. The total torque for the driving motors and the distributed torques are expressed by Equations 4, 5, and 6 below.

$$T_{Main,total} = T_{Front} + T_{Rear} \quad \text{[Equation 4]}$$

$$T_{Front} = K_{drift} \times T_{Main,total} \quad \text{[Equation 5]}$$

$$T_{Rear} = (1 - K_{drift}) \times T_{Main,total} \quad \text{[Equation 6]}$$

In Equations 4, 5 and 6, $T_{Main,total}$ indicates the total torque for the driving motors, which is a torque before distribution, and $K_{drift}$ indicates the torque distribution ratio between the front wheels and the rear wheels. Here, $T_{Front}$ indicates the front wheel torque distributed to the front wheels depending on the torque distribution ratio $K_{drift}$ and $T_{Rear}$ indicates the rear wheel torque distributed to the rear wheels depending on the torque distribution ratio $K_{drift}$.

The torque distribution ratio $K_{drift}$ in Equations 5 and 6 is a torque distribution ratio, which is used to assist entry of the vehicle to drift so that the vehicle may reach the drift driving state, and a torque distribution ratio, which is used to assist entry of the vehicle to drift only in assisting entry of the vehicle to drift.

In assisting entry of the vehicle to drift, the controller (VCU) 30 controls operation of the driving motors, i.e., the front wheel motor and the rear wheel motor, through a front wheel motor command and a rear wheel motor command. A front wheel motor torque command value and a rear wheel motor torque command value correspond to the torques after distribution stated in Equations 5 and 6, i.e., the front wheel torque $T_{Front}$ and the rear wheel torque $T_{Rear}$ distributed depending on the torque distribution ratio $K_{drift}$ used to assist entry of the vehicle to drift.

Consequently, control for assisting entry of the vehicle to drift may be performed depending on the torques after distribution. For example, after the controller (VCU) 30 has determined the front wheel torque and the rear wheel torque by performing torque distribution, as set forth in Equations 5 and 6, the controller (VCU) 30 may generate and output the front wheel motor torque command and the rear wheel motor torque command configured to output the distributed torques.

Here, when the controller (VCU) 30 transmits the generated front wheel motor torque command and rear wheel motor torque command to the MCU 40, the MCU 40 may control operation of the front wheel motor 3 and the rear wheel motor 4 depending on the received front wheel motor torque command and rear wheel motor torque command received from the VCU 30 and may assist entry of the vehicle to drift through such a process.

In one embodiment of the present disclosure, in relation to the torque distribution ratio, in the case of the turning acceleration situation in which the driving torque is applied, the torque distribution ratio $K_{drift}$ of the driving force set forth in Equations 5 and 6 may be tuned and set to a smaller value. Thus, greater driving force may be applied to the rear wheels in the same driving torque operating condition so as to maximize slip of the rear wheels, compared to the case in which one of the other driving modes, such as the eco mode, the normal mode, the sport mode, and the like, is selected. The driving torque, which is a motor toque in the turning acceleration situation, is a positive (+) torque.

In the acceleration situation in which the driving torque is applied, decrease in the torque distribution ratio $K_{drift}$ set forth in Equations 5 and 6 means that a greater driving torque (a positive torque) is distributed to the rear wheels compared to in the driving conditions at the same driving torque in the other driving modes, and means that a greater driving torque (a positive torque) is distributed to the rear wheels than the front wheels.

In other words, when the value of the torque distribution ratio $K_{drift}$ in assisting entry of the vehicle to drift is less than the value of the torque distribution ratio in the driving conditions at the same driving torque in the other driving modes, the value of the front wheel torque $T_{Front}$ set forth in Equation 5 is decreased compared to in the other driving mode, and the value of the rear wheel torque $T_{Rear}$ set forth in Equation 6 is increased compared to in the other driving modes.

Further, in the turning acceleration situation of the vehicle, the value of the torque distribution ratio $K_{drift}$ of the driving force set forth in Equations 5 and 6 may be set so that greater driving force may be applied to the rear wheels than the front wheels to maximize slip of the rear wheels.

As the value of the torque distribution ratio $K_{drift}$ in assisting entry of the vehicle to drift is decreased, the front wheel torque $T_{Front}$ which is the driving torque, as set forth in Equation 5, is determined to have a smaller value. The rear wheel torque $T_{Rear}$ which is the driving torque, as set forth in Equation 6, is determined to have a greater value.

Such front and rear wheel torque distribution is performed to maximize slip of the rear wheels. Among the total torque for the driving motors, determined from the driver request torque (the total request torque), a maximum torque that the rear wheel motor may output, is distributed as the rear wheel torque as long as the maximum torque does not exceed a limit value in a T-N (torque-speed) curve of the rear wheel motor. When the total torque for the driving motors is greater than the maximum torque which the rear wheel motor may output, a remaining torque is distributed as the front wheel torque.

Front and rear wheel torque distribution using the above-described torque distribution ratio $K_{drift}$ according to the present disclosure may be used in the process of assisting entry of the vehicle to drift and the process of assisting maintenance of drift of the vehicle. Here, the torque distribution ratio may be set such that a torque distributed to the rear wheels is increased in the order of the eco mode, the normal mode, and the sport mode as the driving modes of the vehicle.

For example, 100% of the total torque $T_{Main,total}$ for the driving motors may be distributed as the rear wheel torque $T_{Rear}$ in the sport mode, and 70% of the total torque $T_{Main,total}$ for the driving motors may be distributed as the rear wheel torque $T_{Rear}$ in the eco mode.

In the case that a function of setting drift strength in the drift mode through an interface, such as a separate input device, by the driver is provided, a smaller value may be selected as the torque distribution ratio $K_{drift}$ so that, as the value of the drift strength set by the driver is increased (as the drift strength set by the driver increases), the torque distributed to the rear wheels as the rear wheel torque is increased. In other words, the torque distribution ratio $K_{drift}$ may be a tuning factor, which reflects a driver's intention.

In summary, the basic strategy of front and rear wheel torque distribution is to promote assistance of entry of the vehicle to drift and assistance of maintenance of drift of the vehicle by distributing the rear wheel torque to the rear wheels. In this case, the torque distribution ratio $K_{drift}$ may be used as a factor, which may reflect a driver's intention.

In the turning acceleration situation in which the driving torque is applied, the torque before distribution, i.e., the total torque for the driving motors, in Equation 4 may have a positive (+) value. In this case, when the value of the torque distribution ratio $K_{drift}$ is decreased, a smaller driving torque (a positive torque) is distributed to the front wheels and a greater driving torque (a positive torque) is distributed to the rear wheels, compared to in the other driving modes. Slip of the rear wheels may thereby be maximized.

On the contrary, in the turning deceleration situation in which the braking torque is applied, the front wheel torque and the rear wheel torque may be regenerative braking torques applied to the front wheels and the rear wheels by the respective motors. Here, in order to maximize slip of the rear wheels, the torque distribution ratio $K_{drift}$ of the regenerative braking torque $T_{Main,total}$ in Equations 5 and 6 may be tuned and set to a greater value compared to in the driving conditions at the same braking torque in the other driving modes. Thus, greater regenerative braking force may be applied to the front wheels in the driving conditions at the same braking torque, compared to the case in which one of the other driving modes is selected. The regenerative braking torque which is a motor toque in the turning deceleration situation is a negative (−) torque.

In the deceleration situation in which the braking torque is applied, increase in the torque distribution ratio $K_{drift}$ in Equations 5 and 6 means that a greater braking torque (a negative torque) is distributed to the front wheels compared to in the driving conditions at the same braking torque in the other driving modes, and means that a greater braking torque (a negative torque) is distributed to the front wheels than the rear wheels (increase in a regenerative braking amount of the front wheels).

In other words, when the value of the torque distribution ratio $K_{drift}$ in assisting entry of the vehicle to drift is greater than the value of the torque distribution ratio in the driving conditions at the same braking torque in the other driving modes, the value of the front wheel torque $T_{Front}$ applied to the front wheels, as set forth in Equation 5, is increased compared to in the other driving mode (indicating that the absolute value of the regenerative braking torque, which is a negative torque is increased), and the value of the rear wheel torque $T_{Rear}$ applied to the rear wheels, as set forth in Equation 6, is decreased compared to in the other driving modes (indicating that the absolute value of the regenerative braking torque, which is a negative torque, is decreased).

Further, in the turning deceleration situation of the vehicle, the value of the torque distribution ratio $K_{drift}$ of the driving force set forth in Equations 5 and 6 may be set so that a greater regenerative braking torque may be applied to the front wheels than the rear wheels to maximize slip of the rear wheels.

As the value of the torque distribution ratio $K_{drift}$ in assisting entry of the vehicle to drift is increased, the rear wheel torque $T_{Rear}$, which is the regenerative braking torque, as set forth in Equation 6, is determined to have a smaller value. The front wheel torque $T_{Front}$, which is the regenerative braking torque, as set forth in Equation 5, is determined to have a greater value.

Of course, this means that the absolute value of the front torque, which is a negative torque, is determined to be a greater value, and means that the regenerative braking amount of the front wheels is greater than the regenerative braking amount of the rear wheels.

In the turning deceleration situation of the vehicle, the torque before distribution, i.e., the total torque $T_{Main,total}$ for the driving motors, in Equation 4 may be a regenerative braking torque having a negative (−) value. In this case, when the value of the torque distribution ratio $K_{drift}$ is decreased, a greater regenerative braking torque $T_{Front}$ is distributed to the front wheels and a smaller regenerative braking torque $T_{Rear}$ is distributed to the rear wheels, compared to in the other driving modes. Slip of the rear wheels may thereby be maximized. Because the grip circle of the rear wheels due to forward load transfer during deceleration of the vehicle is reduced.

Such front and rear wheel torque distribution in the turning deceleration situation is to maximize forward transfer of the load of the vehicle. Also, rotation in the reverse direction may occur due to the regenerative torque of the rear wheels when the vehicle enters drift, only in some cases, i.e., in the case of an electric vehicle, in the case in which friction on the road is small, and the like.

Therefore, grip force of the front wheels of the vehicle on the road is increased by forward transfer of the load of the vehicle. Thus, deceleration of the vehicle may be maximized. As a forward load transfer amount is increased, the normal force of the rear wheels is decreased and grip force of the rear wheels is decreased. Thus, the vehicle becomes in a state of easily deviating from the grip circle (i.e., lateral force applied is decreased), and oversteer occurs in which the vehicle loses the bearings thereof easily.

In one embodiment of the present disclosure, in torque distribution to the front wheel motor and the rear wheel motor, as set forth in Equations 4, 5, and 6, the torque distribution ratio $K_{drift}$ should be determined so that the distributed torques $T_{Front}$ and $T_{Rear}$ may be calculated within allowable maximum limit torques of the front wheel motor and the rear wheel motor.

For this purpose, for example, the torque distribution ratio $K_{drift}$ may be determined by a map in which the driver request torque depending on the driver's driving input and the actual yaw rate detected by the yaw rate sensor are used as inputs. Thereby, torque distribution between the front wheels and the rear wheels may be differentiated depending on a driving state including the yaw rate of the vehicle while satisfying the driver request torque.

Furthermore, in determining the torque distribution ratio $K_{drift}$ in the present disclosure, in the case of turning acceleration, the torque distribution ratio $K_{drift}$ may be determined so that a greater torque is distributed to the rear wheels than the front wheels. Particularly, the torque distribution ratio $K_{drift}$ may be determined so that, as the value of the actual yaw rate detected by the yaw rate sensor increases, or as the absolute value of the driver request torque increases, the torque distributed to the rear wheels increases.

On the contrary, in the case of turning deceleration, the torque distribution ratio $K_{drift}$ may be determined so that a greater torque (regenerative braking torque) is distributed to the front wheels than the rear wheels. Particularly, the torque distribution ratio $K_{drift}$ may be determined so that, as the value of the actual yaw rate detected by the yaw rate sensor increases, or as the absolute value of the driver request torque increases, the torque distributed to the front wheels increases.

Further, in assisting entry of the vehicle to drift, a TV motor torque for controlling the TV motor is described. Equation 7 below is an equation to calculate the TV motor torque.

$$T_{TV} = K_p \times \left( (\dot{\psi}_{des} + K_{over}) - \dot{\psi}_{act} \right) \qquad [\text{Equation 7}]$$

Here, $T_{TV}$ indicates the TV motor torque, and $K_p$ indicates a predetermined proportional constant. Further, $\dot{\psi}_{des}$ indicates a target yaw rate, $K_{over}$ indicates an offset of the target yaw rate $\dot{\psi}_{des}$, and $\dot{\psi}_{act}$ indicates the actual yaw rate of the vehicle detected by the yaw rate sensor from among the vehicle driving state information.

The offset $K_{over}$ is used to correct the target yaw rate $\dot{\psi}_{des}$ in assisting entry of the vehicle to drift, and correction of the target yaw rate $\dot{\psi}_{des}$ using the offset $K_{over}$ is to assist entry of the vehicle to drift and to intentionally induce the oversteer state of the vehicle.

In one embodiment of the present disclosure, the value of the offset $K_{over}$ to correct the target yaw rate $\dot{\psi}_{des}$ may be determined based on the real-time vehicle driving state information. More concretely, the value of the offset $K_{over}$ may be determined based on the lateral acceleration $a_y$ and the actual yaw rate $\dot{\psi}_{act}$ of the vehicle detected by the lateral acceleration sensor and the yaw rate sensor from among the vehicle driving state information. Here, the value of the offset $K_{over}$ may be determined by a map in which the lateral acceleration $a_y$ and the actual yaw rate $\dot{\psi}_{act}$ of the vehicle, which are values detected in real time by the sensors, are used as inputs.

Further, the target yaw rate $\dot{\psi}_{des}$ may be determined based on the real-time vehicle driving state information during turning of the vehicle, and for example, may be a value calculated from a longitudinal vehicle speed $v_x$ and a steering angle $\delta_f$, which are values detected in real time by sensors, by equations.

The target yaw rate $\dot{\psi}_{des}$ is one of control variables which are already used widely in driving control of vehicles, and various equations or methods to calculate a target yaw rate are known to those of ordinary skill in the art to which the present disclosure pertains ("those of ordinary skill in the art").

Any one selected from the known equations or methods, which may calculate a target yaw rate of a vehicle during turning of the vehicle, may be used to calculate the target yaw rate $\dot{\psi}_{des}$ in the present disclosure.

Equation 8 below is one example of vehicle bicycle model-based equations which may calculate a target yaw rate.

$$\dot{\psi}_{des} = \frac{v_x}{1 + \left(\frac{v_x}{v_{Char}}\right)^2} \frac{\delta_f}{L} = \frac{v_x}{1 + \frac{m v_x^2}{L^2}\left(\frac{l_r}{C_f} - \frac{l_f}{C_r}\right)} \frac{\delta_f}{L} \qquad [\text{Equation 8}]$$

Here, $v_x$ indicates the longitudinal vehicle speed, $\delta_f$ indicates the steering angle (the actual steering angle of front wheel tires), and m indicates the mass of the vehicle.

Further, $l_f$ indicates a distance from the center of gravity of the vehicle to the front wheels of the vehicle (a front wheel base), and $l_r$ indicates a distance from the center of gravity of the vehicle to the rear wheels (a rear wheel base) of the vehicle (a rear wheel base).

Further, $C_f$ indicates cornering stiffness of the front wheels, $C_r$ indicates cornering stiffness of the rear wheels, L indicates a motor vehicle space (a wheel base), and $V_{char}$ indicates a characteristic speed (handling characteristics) of the vehicle which is predetermined as a unique value of the vehicle.

The equations and methods to calculate a target yaw rate based on vehicle driving state information by a controller of a vehicle are known to those of ordinary skill in the art, and a detailed description thereof is thus omitted.

Referring to Equation 7, it may be confirmed that the TV motor torque $T_{TV}$ is determined as a value calculated by multiplying a difference value between a corrected target yaw rate $\psi_{des}\dot{}+K_{over}$, obtained by applying the offset $K_{over}$ to the target yaw rate $\psi_{des}\dot{}$, and the actual yaw rate $\psi_{act}\dot{}$, by the proportional constant $K_p$.

Consequently, in assisting entry of the vehicle to drift, when the TV motor torque is calculated, operation of the TV motor is controlled using the TV motor torque as the TV motor torque command. For example, when the VCU 30 determines the TV motor torque, as described above, and generates and outputs the TV motor torque command corresponding to the TV motor torque, the MCU 40 controls operation of the TV motor depending on the received TV motor torque command.

FIG. 7 is a graph representing a state in which the yaw rate of the vehicle is controlled so as to assist entry of the vehicle to drift according to one embodiment of the present disclosure. FIG. 7 shows the target yaw rate $\psi_{des}\dot{}$, the corrected target yaw rate $\psi_{des}\dot{}+K_{over}$, obtained by applying the offset $K_{over}$ to the target yaw rate $\psi_{des}\dot{}$, the actual yaw rate $\psi_{des,No\ Control}\dot{}$ before performing drift entry assistance control, and the actual yaw rate $\psi_{des,Drift\ Control}\dot{}$ after performing drift entry assistance control.

As shown in FIG. 7, when control for assisting entry of the vehicle to drift is started, the yaw rate $\psi_{des,Drift\ control}\dot{}$ of the vehicle is controlled to follow the corrected target yaw rate $\psi_{des}\dot{}+K_{over}$ obtained by applying the offset $K_{over}$ to the target yaw rate $\psi_{des}\dot{}$.

When the vehicle reaches the drift driving state in assisting entry of the vehicle to drift, the controller (VCU) 30 assists maintenance of drift of the vehicle so that the vehicle may maintain the drift driving state.

In assisting maintenance of drift of the vehicle, the controller (VCU) 30 determines first whether or not predetermined drift maintenance assistance execution conditions are satisfied from the vehicle driving state information acquired by the driving information detector 21.

When the vehicle reaches the drift driving state, countersteer inevitably occurs in which the turning direction of the vehicle and the steering angle direction are opposite to each other. Occurrence of countersteer may be determined based on the actual yaw rate and steering angle of the vehicle detected by the respective sensors.

In other words, when the product of a yaw rate sign value (+1 or −1) indicating the yaw rate direction of the vehicle and a steering angle sign value (+1 or −1) indicating the steering angle is a negative (−) value less than 0, the turning direction of the vehicle and the steering angle direction are opposite to each other. It may thus be determined that the vehicle is in the countersteer state by the driver.

Further, when the product of the yaw rate sign value (+1 or −1) and the steering angle sign value (+1 or −1) is a positive (+) value greater than 0, the turning direction of the vehicle and the steering angle direction are the same as each other. It may thus be determined that the vehicle releases the countersteer state.

Further, in one embodiment of the present disclosure, the controller (VCU) 30 determines whether or not the drift maintenance assistance execution conditions are satisfied by confirming a countersteer maintenance state using the lateral acceleration, the actual yaw rate, and the steering angle of the vehicle, which are the values detected by the respective sensors, from among the vehicle driving state information (in Operation S5 in FIG. 5).

The drift maintenance assistance execution conditions include a condition in which the absolute value of the lateral acceleration of the vehicle detected by the lateral acceleration sensor is greater than a predetermined fourth lateral acceleration set value. The drift maintenance assistance execution conditions may further include a condition in which the absolute value of the actual yaw rate of the vehicle detected by the yaw rate sensor is greater than a predetermined fourth yaw rate set value and a condition in which the countersteer state is maintained for a first set time.

Further, the controller (VCU) 30 may determine whether or not drift maintenance assistance release conditions are satisfied by confirming the lateral acceleration and the actual yaw rate of the vehicle from among the vehicle driving state information, and the countersteer maintenance state.

Here, the drift maintenance assistance release conditions include a condition in which the absolute value of the lateral acceleration of the vehicle detected by the lateral acceleration sensor is less than a predetermined fifth lateral acceleration set value. The drift maintenance assistance release conditions may further include a condition in which the absolute value of the actual yaw rate of the vehicle detected by the yaw rate sensor is less than a predetermined fifth yaw rate set value. The drift maintenance assistance release conditions may further include a condition in which a second set time has passed after releasing the countersteer state.

The fourth lateral acceleration set value may be the same as or different from the first lateral acceleration set value, the second lateral acceleration set value, or the third lateral acceleration set value.

In the same manner, the fifth lateral acceleration set value may be the same as or different from the first lateral acceleration set value, the second lateral acceleration set value, the third lateral acceleration set value, or the fourth lateral acceleration set value.

Further, the fourth yaw rate set value may be the same as or different from the first yaw rate set value, the second yaw rate set value, or the third yaw rate set value. Also, the fifth yaw rate set value may be the same as or different from the first yaw rate set value, the second yaw rate set value, the third yaw rate set value, or the fourth yaw rate set value. The first set time and the second set time may be the same or be different.

In the present disclosure, the controller (VCU) 30 performs control for assisting maintenance of drift of the vehicle, when all the drift maintenance assistance execution conditions are satisfied. The controller 30 releases a drift maintenance assistance control state and returns to the previous operation, i.e., assisting entry of the vehicle to drift, when all the drift maintenance assistance release conditions are satisfied.

When the drift maintenance assistance execution conditions are satisfied, the controller (VCU) 30 first determines a target speed of one of the rear left wheel RL and the rear right wheel RR, serving as an inner wheel during turning of the vehicle, so as to assist maintenance of drift of the vehicle (in Operation S6 in FIG. 5).

Here, the controller (VCU) 30 may determine the target speed of the inner wheel as the actual speed of the other of the rear left wheel RL and the rear right wheel RR, serving as an outer wheel during turning of the vehicle so as to synchronize the speeds of the inner wheel and the outer wheel.

For reference, when the vehicle enters drift, i.e., when the vehicle reaches the drift driving state, the lateral acceleration and yaw rate of the vehicle are rapidly increased due to oversteer.

Further, the tire grip state of the inner wheel is not maintained due to load transfer of the vehicle to left and right, and driving force is not transmitted to the outer wheel and is transmitted to the inner wheel by the open differential system.

When driving force is greater than the tire grip friction limit of the inner wheel, the remaining driving force is used to spin the inner wheel. Thereby, the vehicle loses the driving force of the outer wheel and loses the yaw moment and may thus not maintain drifting longer.

Therefore, the controller (VCU) 30 should control the speed of the inner wheel using the TV motor during turning of the vehicle so that the inner wheel does not slip (control of slip of the inner wall) (in Operation S7 in FIG. 5), and in this case, two effects may be acquired.

In other words, reaction force is applied to the open differential by applying the TV motor torque in the opposite direction to the driving force to the inner wheel, and thereby, the driving force is applied to the outer wheel. Thus, an additional yaw moment may be generated.

Further, total driving force may be conserved while applying the TV motor torque in the same direction as the driving force to the outer wheel as much as the TV motor torque applied to the inner wheel.

Further, the controller (VCU) 30 determines the target speed of the inner wheel as the actual speed of the outer wheel, detected by the corresponding wheel speed sensor, and synchronizes rear wheel axles to induce slip of the rear wheels, thereby performing control for assisting maintenance of drift of the vehicle.

Here, '$w_{RL}-w_{RR}$' in Equation 3 become 0 ($w_{RL}$ indicating the rear left wheel speed, and $w_{RR}$ indicating the rear right wheel speed) due to the hardware configuration of the TV motor. Thus, the TV motor speed $w_{TV}$ becomes 0. Consequently, when the target speed of the inner wheel is converted into a target speed at the TV motor, the target speed $w_{TV,des}$ at the TV motor becomes 0, i.e., '$w_{TV,des}=0$'.

In assisting maintenance of drift of the vehicle, the controller (VCU) 30 controls the speed (rpm) of the TV motor through speed control of the TV motor, and thereby, synchronizes the inner wheel and the outer wheel.

Further, in assisting maintenance of drift of the vehicle, the controller (VCU) 30 determines a target torque $T_{TV}$ for controlling the torque of the TV motor as the sum of a feedforward torque $T_{TV,FF}$ and a feedback torque $T_{TV,FB}$. For this purpose, the controller (VCU) 30 may calculate the feedforward torque $T_{TV,FF}$ based on load transfer between the rear left wheel and the rear right wheel and may calculate the feedback torque $T_{TV,FB}$ based on PID control using a speed error between the rear left wheel and the rear right wheel.

In relation to a feedforward torque, operation of the steering wheel by the driver is required to maintain the drift driving state of the vehicle, and in this case, countersteer occurs. Therefore, when the feedforward torque based on the steering angle is calculated, a torque in the opposite direction to the turning direction, i.e., a TV torque suppressing drift, may be calculated.

Therefore, in order to sense the turning direction regardless of the steering angle, the feedforward torque corresponding to the states of the inner wheel and the outer wheel may be determined based on estimated load transfer values of the vehicle.

Here, in one embodiment of the present disclosure, the controller (VCU) 30 may use estimated values of a normal force $F_{N,RL}$ of the rear left wheel and a normal force $F_{N,RR}$ of the rear right wheel based on the values of the longitudinal acceleration ax and the lateral acceleration $a_y$ of the vehicle detected by the driving information detector 21, as the estimated load transfer values.

Equation 9 below is an equation for calculating the feedforward torque $T_{TV,FF}$ according to one embodiment of the present disclosure.

$$T_{TV,FF} = \left(\frac{F_{N,RL}}{F_{N,RL} + F_{N,RR}} - 0.5\right) \times K_{speed} \quad \text{[Equation 9]}$$

Here, $T_{TV,FF}$ indicates the feedforward torque, $F_{N,RL}$ indicates the normal force of the rear left wheel, and $F_{N,RR}$ indicates the normal force of the rear right wheel. Further, $K_{speed}$ is a torque factor for torque vectoring (TV) control determined to apply the additional yaw moment to the vehicle in the turning direction depending on a normal force ratio between the rear left wheel and the rear right wheel.

The controller (VCU) 30 may determine the TV control torque factor $K_{speed}$ as a value depending on the real-time vehicle driving state acquired by the driving information detector 21, and in more detail, as a value based on a difference value between the rear left wheel speed and the rear right wheel speed and an estimated vehicle speed from among the vehicle driving state information.

In one embodiment of the present disclosure, the TV control torque factor $K_{speed}$ may be determined by a map in which the difference value between the rear left wheel speed and the rear right wheel speed, detected by the wheel speed sensors, and the estimated vehicle speed are used as inputs. Here, in the map, as the difference value between the rear left wheel speed and the rear right wheel speed increases, the TV control torque factor $K_{speed}$ may be set to a higher value.

Here, the estimated vehicle speed is obtained through the wheel speed sensors, an inertial measurement unit (IMU) sensor, and the like, and means an estimated value of an actual vehicle speed by a general method. Such a method of estimating the vehicle speed is known and a detailed description thereof has thus been omitted.

The estimated vehicle speed may be a general vehicle speed obtained by sensors. A vehicle speed through wheel speed sensors may be a value detected by the wheel speed sensors provided in non-driving wheels provided in a vehicle. But, in the present disclosure, in the case of a four-wheel drive vehicle, four wheels may slip like in a drift situation. Thus, the estimated vehicle speed means an estimated value of the actual speed of the vehicle obtained through known technology, such as using wheel speed sensors and an inertial measurement unit (IMU) sensor, other than using only signals from the wheel speed sensors.

The normal forces of the left wheel and the right wheel required to calculate the feedforward torque $T_{TV,FF}$ in Equation 9 may be calculated by Equation 10 and Equation 11 below.

$$F_{N,RL} = m \times \left( \frac{l_f \times g}{L} + \frac{h_{C.G}}{L} a_x \right) \times \left( 0.5 - \frac{h_{C.G}}{T_r} \times \frac{a_y}{g} \right) \quad \text{[Equation 10]}$$

$$F_{N,RR} = m \times \left( \frac{l_f \times g}{L} + \frac{h_{C.G}}{L} a_x \right) \times \left( 0.5 + \frac{h_{C.G}}{T_r} \times \frac{a_y}{g} \right) \quad \text{[Equation 11]}$$

In Equation 10 and Equation 11, m indicates the mass of the vehicle, $l_f$ indicates a distance from the center of gravity of the vehicle to the front wheels of the vehicle (the front wheel base) and L indicates the motor vehicle space (the wheel base).

Further, g indicates acceleration due to gravity, $h_{C.G}$ indicates a center of gravity height of the vehicle, $T_r$ indicates a tread of the vehicle, ax indicates the longitudinal acceleration of the vehicle detected by the lateral acceleration sensor, and $a_y$ indicates the lateral acceleration of the vehicle detected by the lateral acceleration sensor.

In Equation 10 and Equation 11, the second term is a term regarding influence of load transfer in the forward and rearward directions, and the third term is a term regarding influence of load transfer in the leftward and rightward directions.

Thereafter, the controller (VCU) 30 may use the PID control-based feedback torque $T_{TV,FB}$ to secure speed control responsiveness and convergence. The controller (VCU) 30 may calculate the feedback torque $T_{TV,FB}$ by Equation 12 below.

$$T_{TV,FB} = K_p \times \text{error}_{TV} + K_i \int \text{error}_{TV} dt + K_d \frac{d}{dt}(\text{error}_{TV}) \quad \text{[Equation 12]}$$

Here, $T_{TV,FB}$ indicates the feedback torque, $\text{error}_{TV}$ indicates a TV motor-based wheel speed error, and $K_p$, $K_i$, and $K_d$ are a P gain, a I gain, and a D gain, respectively.

In Equation 12, the TV motor-based wheel speed error $\text{error}_{TV}$ is calculated by Equation 13 below.

$$\text{error}_{TV} = w_{TV,des} - G \times (w_{RL} - w_{RR}) = G \times (w_{RR} - w_{RL}) \quad \text{[Equation 13]}$$

Here, $w_{TV,des}$ indicates the target speed of the TV motor, and G indicates a gear ratio of the TV motor. Further, $w_{RL}$ indicates the rear left wheel speed, $w_{RR}$ indicates the rear right wheel speed, and the rear left wheel speed $w_{RL}$ and the rear right wheel speed $w_{RR}$ are detected by the respective wheel speed sensors.

In Equation 13, the target speed $w_{TV,des}$ of the TV motor is 0. Thus, the TV motor-based wheel speed error $\text{error}_{TV}$ becomes '$G \times (w_{RR} - w_{RL})$'.

Thereby, the controller (VCU) 30 determines the TV motor torque $T_{TV}$ for assisting maintenance of drift of the vehicle by adding up the feedforward torque $T_{TV,FF}$ calculated by Equation 9 and the feedback torque $T_{TV,FB}$ calculated by Equation 12, and controls operation of the TV motor to output the predetermined TV motor torque.

During execution of the operation of assisting maintenance of drift of the vehicle, the controller (VCU) 30 determines whether or not the drift mode is released by the driver (in Operation S8 in FIG. 5), terminates drift control, upon determining that the drift mode is released, and returns to a mode selected from among the driving modes of the vehicle by the driver or a predetermined mode after releasing the drift mode.

In one embodiment of the present disclosure, determining whether or not the drift mode is released by the driver (determination as to whether or not the drift mode is released) includes a process of determining, by the controller (VCU) 30, whether or not the drift mode is released by the driver.

Further, in one embodiment of the present disclosure, determining whether or not the drift mode is released by the driver further includes a process of determining, by the controller (VCU) 30, whether or not the speed of the front wheels and the speed of the rear wheels of the vehicle are synchronized.

In other words, the controller (VCU) 30 determines that the drift mode is released when predetermined drift mode release conditions are satisfied. The drift mode release conditions include a condition in which the drift mode is turned off by the driver and a condition in which the speed of the front wheels and the speed of the rear wheels of the vehicle are synchronized.

In one embodiment of the present disclosure, the driver may turn off the drift mode by selecting one mode from among the driving modes of the vehicle other than the drift mode by operating the mode selection device 22. Then, the controller (VCU) 30 may determine that the drift mode is turned off by confirming selection of the mode other than the drift mode by the driver by operating the mode selection device 22.

Otherwise, in the case of the mode selection device 22, which may be operated to turn on and off the drift mode, the driver may operate the mode selection device 22 from the ON state to the OFF state. Then the controller (VCU) 30 may determine that the driver turns off the drift mode by confirming the OFF state of the mode selection device 22. As such, in the case of the mode selection device 22 which may be operated to turn on and off the drift mode, the controller (VCU) 30 returns to the previous mode or a predetermined mode when the drift mode is released.

In determining whether or not the speed of the front wheels and the speed of the rear wheels are synchronized, the controller (VCU) 30 calculates the average speed of the front left wheel and the front right wheel and the average speed of the rear left wheel and the rear right wheel based on speed information of the respective wheels acquired from signals from the wheel speed sensors of the driving information detector 21.

Further, the controller (VCU) 30 may determine that the speed of the front wheels and the speed of the rear wheels are synchronized, when a state in which a difference between the calculated average speed of the front wheels and the calculated average speed of the rear wheels is less than a predetermined set value is maintained for a third set time.

Consequently, the controller (VCU) 30 may determine whether or not all of the conditions in which the drift mode is turned off by the driver and in which the speed of the front wheels and the speed of the rear wheels of the vehicle are synchronized are satisfied.

Further, upon determining that all of the drift mode release conditions are satisfied, the controller (VCU) 30 releases the drift mode, terminates drift control, and returns to another driving mode selected by the driver, or returns to the previous driving mode or the predetermined driving mode.

On the contrary, upon determining that all of the two conditions are not satisfied, the controller (VCU) 30 does not release the drift mode. Particularly, when only the speed synchronization condition is satisfied in the state in which the drift mode is in the ON state, the controller (VCU) 30 returns to the operation of assisting entry of the vehicle to drift, and again performs the control process of assisting entry of the vehicle to drift.

The control method of drift driving of the vehicle according to one embodiment of the present disclosure was described in detail above.

The control method according to the present disclosure may assist the vehicle to reach the drift driving state and may assist the vehicle to maintain the drift driving state. Particularly, the control method according to the present disclosure may provide the drift control function using the electric-powered torque vectoring apparatus.

The method according to the present disclosure may perform front and rear wheel torque distribution by the driving motors in assisting entry of the vehicle to drift by applying the torque distribution ratio for entry of the vehicle to drift. The method simultaneously may perform assistance control configured to provide an additional yaw moment by the TV motor, thereby being capable of promoting increase in drift entry and maintenance and increase in a turning escape speed.

Further, the control method according to the present disclosure may maximize a driver's drift driving experience through drift driving assistance and may increase control responsiveness and control stability because drift driving assistance is performed in a motor control manner other than a manner using a hydraulic actuator, such as a brake or a clutch.

Further, durability problems of parts conventionally caused by maintenance of drift may be improved, and the drift entry assistance function and the drift maintenance assistance function may be supported. For example, durability of a brake element may be increased compared to drift driving assistance using a brake, and durability of a clutch element may be increased compared to drift driving assistance using an LSD.

In the case that drift driving control according to the present disclosure is not applied, even though the vehicle enters the drift driving state, the inner wheel loses driving force due to slip during turning. Thus, the drift driving state may not be maintained, and may be easily released.

On the other hand, in the case that drift driving control according to the present disclosure is performed, the speed of the inner wheel and the speed of the outer wheel are synchronized during turning through control of the TV motor in a situation in which drift driving of the vehicle is performed, and constant slip of the rear wheels is induced compared to the front wheels. Thus, the drift driving state of the vehicle may be maintained.

Further, in the case that drift driving control according to the present disclosure is performed, oversteer may be maximized due to an additional yaw moment while reducing the slip amount of the inner wheel by applying the TV motor torque before the vehicle enters the drift driving state, thereby being capable of assisting entry of the vehicle to drift.

In addition, the wheels of the vehicle do not lose driving force by synchronizing the speed of the inner wheel and the speed of the outer wheel during turning in the state in which the vehicle has entered drift. Thus, the yaw moment may be conserved and the turning speed of the vehicle may be increased, thereby being capable of assisting maintenance of drift of the vehicle.

As is apparent from the above description, a control method of drift driving of a vehicle according to the present disclosure may improve durability problems of parts conventionally caused by maintenance of drift and may support a drift entry assistance function and a drift maintenance assistance function, while maximizing driver's drift driving experience.

Particularly, the control method according to the present disclosure may increase drift entry and maintenance, may improve a turning escape speed of the vehicle, and may solve durability problems of a brake element and a clutch element due to maintenance of drift of the vehicle.

The disclosure has been described in detail with reference to various embodiments thereof. However, it should be appreciated by those of ordinary skill in the art that changes may be made in these embodiments without departing from the principles and spirit of the disclosure, the scope of which is defined in the appended claims and their equivalents.

What is claimed is:

1. A control method for drift driving a vehicle, the control method comprising:
determining, by a controller, whether or not drift entry assistance control is required based on vehicle driving state information, when the vehicle enters a drift mode; and
performing, by the controller, the drift entry assistance control using a torque vectoring motor so that the vehicle reaches a drift driving state, when determining that the drift entry assistance control is required,
wherein performing the drift entry assistance control includes
distributing a total torque to drive the vehicle in part to front wheels as a front wheel torque and in part to rear wheels as a rear wheel torque depending on a torque distribution ratio for drift entry assistance determined based on the vehicle driving state information,
determining a torque of the torque vectoring motor to perform torque distribution to a rear left wheel and a rear right wheel, based on a target yaw rate of the vehicle and an actual yaw rate of the vehicle detected by a yaw rate sensor, and
controlling a front wheel motor and a rear wheel motor to output the distributed front wheel torque and rear wheel torque, and simultaneously controlling the torque vectoring motor to output the determined torque.

2. The control method of claim 1, further comprising:
determining, by the controller, whether or not the vehicle enters the drift mode by a driver,
wherein the controller determines whether or not the drift entry assistance control is required when determining that the vehicle enters the drift mode by the driver.

3. The control method of claim 2, wherein the controller is set to perform the drift entry assistance control when determining that the drift entry assistance control is required within an entry grace time set from a point in time when a set required holding time passes, after the drift mode is turned on by the driver and an operating state of an operating device, manipulated by the driver to allow the vehicle to enter the drift mode, is maintained for the required holding time or more.

4. The control method of claim 1, wherein, in determining whether or not the drift entry assistance control is required:

the vehicle driving state information comprises a lateral acceleration of the vehicle detected by a sensor and the actual yaw rate of the vehicle; and the controller determines whether or not predetermined drift entry assistance requirement conditions are satisfied based on the detected lateral acceleration of the vehicle and the detected actual yaw rate of the vehicle.

5. The control method of claim 4, wherein the drift entry assistance requirement conditions comprise drift entry assistance requirement conditions in a turning acceleration situation of the vehicle, and wherein the drift entry assistance requirement conditions in the turning acceleration situation comprise:
- a condition in which an absolute value of the lateral acceleration of the vehicle detected by a lateral acceleration sensor is greater than a predetermined first lateral acceleration set value;
- a condition in which an absolute value of the actual yaw rate of the vehicle detected by the yaw rate sensor is greater than a predetermined first yaw rate set value; and
- a condition in which a driving torque to drive the vehicle is greater than a predetermined first torque set value.

6. The control method of claim 5, wherein the drift entry assistance requirement conditions further comprise drift entry assistance requirement conditions in a turning deceleration situation of the vehicle, and wherein the drift entry assistance requirement conditions in the turning deceleration situation comprise:
- a condition in which the absolute value of the lateral acceleration of the vehicle detected by the lateral acceleration sensor is greater than a predetermined second lateral acceleration set value;
- a condition in which the absolute value of the actual yaw rate of the vehicle detected by the yaw rate sensor is greater than a predetermined second yaw rate set value; and
- a condition in which a braking torque configured to decelerate the vehicle is less than a predetermined second torque set value.

7. The control method of claim 6, wherein, in the turning deceleration situation of the vehicle, in distributing the total torque in part to the front wheels as the front wheel torque and in part to the rear wheels as the rear wheel torque, the torque distribution ratio for drift entry assistance is set to a value such that a greater regenerative braking torque is applied to the front wheels than the rear wheels in driving conditions at the same braking torque compared to in an eco mode, in a normal mode, and in a sport mode, corresponding to other driving modes provided to the vehicle.

8. The control method of claim 6, wherein, in the turning deceleration situation of the vehicle, in distributing the total torque in part to the front wheels as the front wheel torque and in part to the rear wheels as the rear wheel torque, the torque distribution ratio for drift entry assistance is set to a value such that a greater regenerative braking torque is applied to the front wheels than the rear wheels.

9. The control method of claim 5, wherein, in the turning acceleration situation of the vehicle, in distributing the total torque in part to the front wheels as the front wheel torque and in part to the rear wheels as the rear wheel torque, the torque distribution ratio for drift entry assistance is set to a value such that a greater torque is applied to the rear wheels than the front wheels in driving conditions at the same driving torque compared to in an eco mode, in a normal mode, and in a sport mode, corresponding to other driving modes provided to the vehicle.

10. The control method of claim 5, wherein, in the turning acceleration situation of the vehicle, in distributing the total torque in part to the front wheels as the front wheel torque and in part to the rear wheels as the rear wheel torque, the torque distribution ratio for drift entry assistance is set to a value such that a greater torque is applied to the rear wheels than the front wheels.

11. The control method of claim 1, wherein, in distributing the total torque in part to the front wheels as the front wheel torque and in part to the rear wheels as the rear wheel torque, the vehicle driving state information to determine the torque distribution ratio for drift entry assistance comprises a driver request torque depending on a driver's driving input and the actual yaw rate of the vehicle detected by the yaw rate sensor.

12. The control method of claim 1, wherein, in determining the torque of the torque vectoring motor, the torque of the torque vectoring motor is determined according to the following equation, $$T_{TV} = K_p \times \left( (\dot{\psi}_{des} + K_{over}) - \dot{\psi}_{act} \right)$$

wherein, $T_{TV}$ indicates the torque of the torque vectoring motor, $K_p$ indicates a predetermined proportional constant, $\dot{\psi}_{des}$ indicates the target yaw rate, $K_{over}$ indicates an offset of the target yaw rate, and $\dot{\psi}_{act}$ indicates the actual yaw rate of the vehicle detected by the yaw rate sensor.

13. The control method of claim 12, wherein the offset is determined based on a lateral acceleration detected by a lateral acceleration sensor, and the actual yaw rate of the vehicle detected by the yaw rate sensor.

14. The control method of claim 1, further comprising:
- determining, by the controller, whether or not predetermined drift maintenance assistance execution conditions are satisfied based on the vehicle driving state information, when the vehicle reaches the drift driving state; and
- performing, by the controller, control configured to assist the vehicle to maintain the drift driving state using the torque vectoring motor, when determining that the drift maintenance assistance execution conditions are satisfied,
- wherein performing the control configured to assist the vehicle to maintain the drift driving state includes
  - determining a target speed of one of a rear left wheel and a rear right wheel corresponding to an inner wheel during turning of the vehicle to achieve speed synchronization between the inner wheel and a remaining one of the rear left wheel and the rear right wheel corresponding to an outer wheel during turning of the vehicle; and
  - controlling a speed and a torque of the torque vectoring motor to achieve the speed synchronization between the inner wheel and the outer wheel using the target speed of the inner wheel.

15. The control method of claim 14, wherein, in determining whether or not the drift maintenance assistance execution conditions are satisfied:
- the vehicle driving state information comprises a lateral acceleration, the actual yaw rate, and a steering angle of the vehicle detected by respective sensors; and
- the drift maintenance assistance execution conditions include a condition in which an absolute value of the detected lateral acceleration of the vehicle is greater than a predetermined fourth lateral acceleration set value;

a condition in which an absolute value of the detected actual yaw rate of the vehicle is greater than a predetermined fourth yaw rate set value; and a condition in which a countersteer state of the vehicle is maintained for a first set time after determining the countersteer state of the vehicle from the detected actual yaw rate and steering angle of the vehicle.

16. The control method of claim 14, wherein, in controlling the speed and the torque of the torque vectoring motor to achieve the speed synchronization:

a target torque configured to control the torque vectoring motor is determined as a sum of a feedforward torque based on a load transfer between the rear left wheel and the rear right wheel and a feedback torque based on proportional-integral-derivative (PID) control using a speed error between the rear left wheel and the rear right wheel; and the feedforward torque is determined using a normal force of the rear left wheel and a normal force of the rear right wheel, estimated based on the lateral acceleration of the vehicle detected by the sensor.

17. The control method of claim 16, wherein the feedforward torque is determined according to the following equation, $$T_{TV,FF} = \left(\frac{F_{N,RL}}{F_{N,RL} + F_{N,RR}} - 0.5\right) \times K_{speed},$$

wherein, $T_{TV,FF}$ indicates the feedforward torque, $F_{N,RL}$ indicates the normal force of the rear left wheel, $F_{N,RR}$ indicates the normal force of the rear right wheel, and $K_{speed}$ is a torque factor for torque vectoring control determined to apply an additional yaw moment to the vehicle in a turning direction depending on a normal force ratio between the rear left wheel and the rear right wheel.

18. The control method of claim 17, wherein the torque factor for torque vectoring control is determined as a value based on a difference value between a rear left wheel speed and a rear right wheel speed detected by wheel speed sensor, and a vehicle speed.

19. The control method of claim 18, wherein the torque factor for torque vectoring control is set to a higher value as the difference value between the rear left wheel speed and the rear right wheel speed increases.

20. The control method of claim 1, wherein, in distributing the total torque in part to the front wheels as the front wheel torque and in part to the rear wheels as the rear wheel torque, in a turning acceleration situation of the vehicle, the torque distribution ratio for drift entry assistance:

is determined as a value such that a greater torque is distributed to the rear wheels than the front wheels; and is determined so that, as a value of the actual yaw rate detected by the yaw rate sensor increases, or as an absolute value of a driver request torque increases, the rear wheel torque distributed to the rear wheels increases, and wherein, in distributing the total torque in part to the front wheels as the front wheel torque and in part to the rear wheels as the rear wheel torque, in a turning deceleration situation of the vehicle, the torque distribution ratio for drift entry assistance:

is determined as a value such that a greater torque is distributed to the front wheels than the rear wheels; and is determined so that, as a value of the actual yaw rate detected by the yaw rate sensor increases, or as an absolute value of a driver request torque increases, the front wheel torque distributed to the front wheels increases.

* * * * *